United States Patent
Buesker et al.

(10) Patent No.: US 9,066,286 B2
(45) Date of Patent: Jun. 23, 2015

(54) AUTOMATIC SELECTION OF COORDINATING FUNCTIONALITY IN A HYBRID COMMUNICATION NETWORK

(71) Applicant: QUALCOMM Incorporated, San Diego, CA (US)

(72) Inventors: Brian Michael Buesker, San Diego, CA (US); Ajay Kumar Vundyala, San Diego, CA (US); Sai Yiu Duncan Ho, San Diego, CA (US); Etan Gur Cohen, San Francisco, CA (US); Rajesh Kumar, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 13/840,566

(22) Filed: Mar. 15, 2013

(65) Prior Publication Data

US 2014/0269652 A1 Sep. 18, 2014

(51) Int. Cl.
*H04W 48/20* (2009.01)
*H04L 12/28* (2006.01)
(Continued)

(52) U.S. Cl.
CPC ........... *H04W 48/20* (2013.01); *H04L 12/2807* (2013.01); *H04L 12/40195* (2013.01); *H04W 84/22* (2013.01)

(58) Field of Classification Search
CPC .................................................... H04W 48/20
USPC ......................................................... 370/255
See application file for complete search history.

(56) References Cited

U.S. PATENT DOCUMENTS

| 2004/0264683 | A1* | 12/2004 | Bye .............................. 379/402 |
| 2005/0281225 | A1* | 12/2005 | Mishra et al. ................. 370/329 |
| 2007/0206551 | A1* | 9/2007 | Moorti et al. ................. 370/338 |

(Continued)

FOREIGN PATENT DOCUMENTS

| EP | 2562962 | 2/2013 |
| WO | 2008032976 | 3/2008 |
| WO | 2014149147 | 9/2014 |

OTHER PUBLICATIONS

"International Application No. PCT/US2014/010495, International Search Report and Written Opinion", Aug. 29, 2014, 25 pages.
"P1905.1/D09 Draft Standard for a Convergent Digital Home Network for Heterogeneous Technologies", Power Line Communications Standards Committee, Dec. 13, 2012, 99 pages.

(Continued)

*Primary Examiner* — Gary Mui
(74) *Attorney, Agent, or Firm* — DeLizio Law, PLLC

(57) ABSTRACT

A hybrid device can be configured to execute operations to select singleton coordinating functionality in a hybrid communication network. In one embodiment, a single master device (e.g., a hybrid device configured as both a registrar and a central access point (CAP)) can be selected. The hybrid device can transmit search messages to detect an existing master device and/or to identify other hybrid devices contending to become the master device. The hybrid device with the preferred device identifier is selected as the master device. In another embodiment, operations for selecting the coordinating functionality are split into two independent stages—a CAP selection stage and a registrar selection stage. In the CAP selection stage, the hybrid device with a preferred device weight (or a preferred device weight and a preferred device identifier) is configured as the CAP. In the registrar selection stage, similar operations can be executed to select the registrar.

56 Claims, 10 Drawing Sheets

(51) Int. Cl.
*H04L 12/40* (2006.01)
*H04W 84/22* (2009.01)

(56) References Cited

U.S. PATENT DOCUMENTS

| | | | |
|---|---|---|---|
| 2012/0207095 A1* | 8/2012 | Moorti et al. | 370/328 |
| 2012/0224481 A1* | 9/2012 | Babiarz et al. | 370/230.1 |
| 2013/0343228 A1* | 12/2013 | Cohen | 370/256 |
| 2014/0119268 A1* | 5/2014 | Chu et al. | 370/312 |
| 2014/0177555 A1* | 6/2014 | Ng et al. | 370/329 |

OTHER PUBLICATIONS

"U.S. Appl. No. 13/840,149 Office Action", Aug. 29, 2014, 7 Pages.
Palm, "Home Networks: From Bits to Gigabits: Lessons Learned from the Evolution of Home Networking", IEEE Consumer Electronics Magazine, IEEE, Piscataway, NJ, USA, vol. 1, No. 3, Jul. 1, 2012, pp. 29-35.
Co-Pending U.S. Appl. No. 13/840,149, filed Mar. 15, 2013, 81 pages.
"PCT Application No. PCT/US2014/010495 Written Opinion", Mar. 20, 2015, 10 pages.

\* cited by examiner

AUTOMATIC SELECTION OF COORDINATING FUNCTIONALITY IN A HYBRID COMMUNICATION NETWORK

BACKGROUND

Embodiments of the inventive subject matter generally relate to the field of communication networks and, more particularly, for automatic selection of coordinating functionality in a hybrid communication network.

Hybrid communication networks typically comprise multiple network devices that implement multiple networking technologies (e.g., wireless local area network (WLAN) technologies, powerline communication technologies, Ethernet, etc.). Typically, the communication mechanisms and protocol specifics (e.g., device and topology discovery, bridging to other networks, etc.) are unique to each networking technology. The multiple networking technologies are typically interconnected using bridging-capable devices that forward frames between the different network technologies and media to form a single, extended communication network. Hybrid communication networks typically present multiple frame delivery routes between any two hybrid devices.

SUMMARY

Various embodiments for automatic selection of coordinating functionality in a hybrid communication network are disclosed. In some embodiments, an advertisement message including a first device weight associated with a first hybrid device is transmitted from the first hybrid device of a hybrid communication network. The first hybrid device then determines whether an advertisement message is received from at least a second hybrid device of the hybrid communication network within a first predetermined search time interval. In response to determining that the advertisement message is not received from at least the second hybrid device within the first predetermined search time interval, the first hybrid device is configured as a central access point of the hybrid communication network, wherein the central access point is communicatively coupled to a gateway of the hybrid communication network via a single communication medium. In response to determining that the advertisement message is received from at least the second hybrid device within the first predetermined search time interval, the central access point of the hybrid communication network is selected based, at least in part, on the first device weight associated with the first hybrid device and a second device weight associated with at least the second hybrid device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
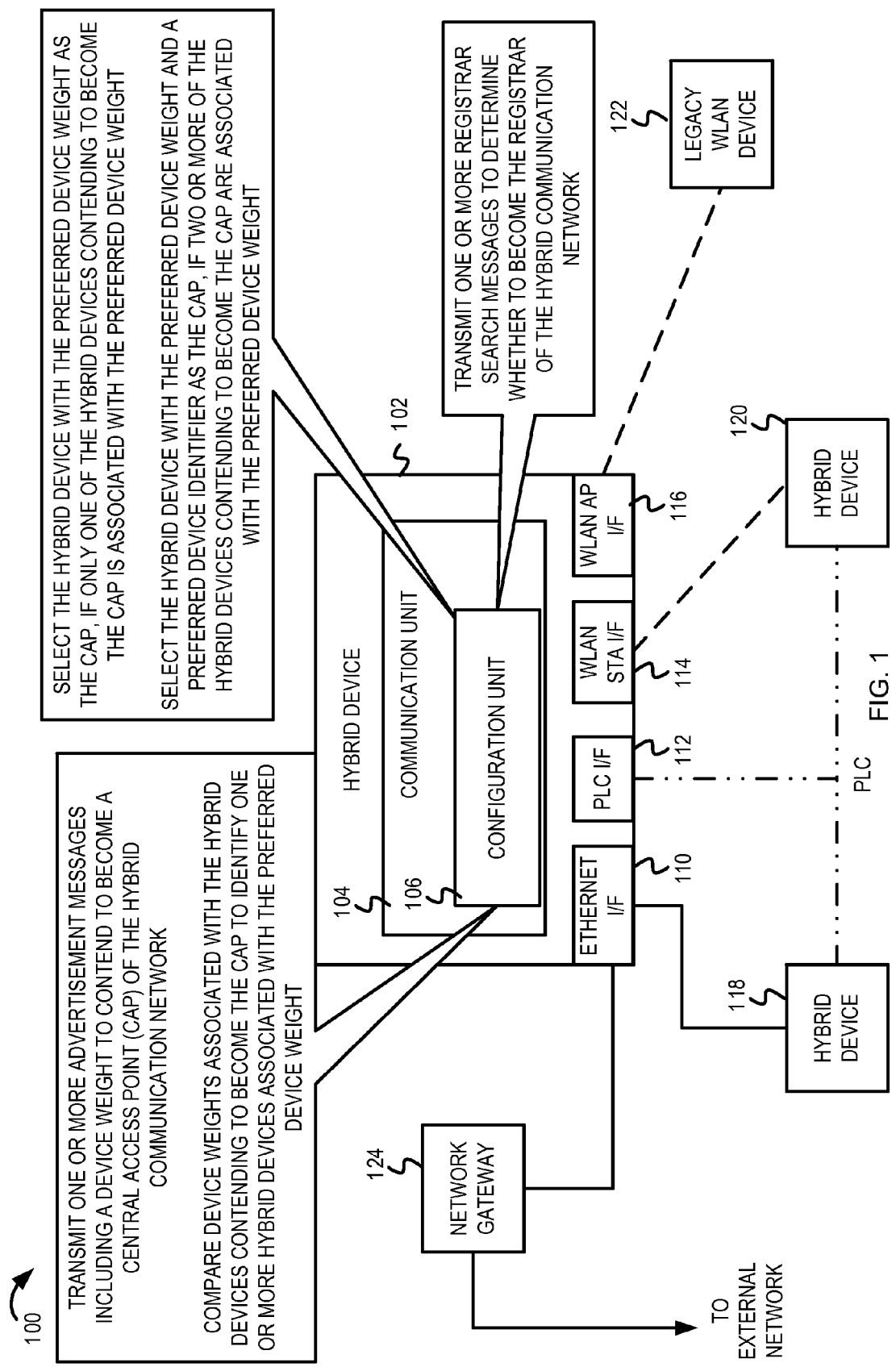
FIG. 1 depicts an example hybrid communication network including a mechanism for selecting coordinating functionality of the hybrid communication network.

The description that follows includes exemplary systems, methods, techniques, instruction sequences, and computer program products that embody techniques of the present inventive subject matter. However, it is understood that the described embodiments may be practiced without these specific details. For instance, although examples refer to configuration of wireless local area network (WLAN) interfaces (e.g., 802.11 compatible devices) of a hybrid device, embodiments are not so limited. In other embodiments, the configuration techniques described herein can be extended to network interfaces that implement other suitable communication protocols and standards (e.g., powerline communication (PLC) interfaces, such as HomePlug® AV interfaces, etc.). Although examples refer to operations for configuring a hybrid device with multiple network interfaces, embodiments are not so limited. In other embodiments, the configuration operations described herein can also be applied to legacy devices (e.g., network devices with a single network interface), such as legacy WLAN devices and/or legacy PLC devices. In other instances, well-known instruction instances, protocols, structures, and techniques have not been shown in detail in order not to obfuscate the description.

In a home network that comprises multiple hybrid devices, each hybrid device may support multiple network interfaces (e.g., a combination of physical (PHY) layer and media access control (MAC) layer) that couple the hybrid device to corresponding multiple communication network segments or access technologies (i.e., Ethernet, WLAN, Coax, PLC, etc.). The hybrid devices in the home network may need to be configured so that the home network only comprises one master network device (e.g., a central access point (CAP) and a registrar). It may be difficult and cumbersome for a user to: 1) determine how each network interface of each hybrid device in the home network should be configured to avoid communication loops in the home network, 2) manually configure each network interface of each hybrid device in the home network for optimal performance of the hybrid devices and the home network, and 3) manually and optimally select the master network device or coordinating functionality (e.g., the central access point and the registrar) of the home network. Moreover, existing solutions (e.g., based on dynamic host configuration protocol (DHCP) server detection on a network interface) may be suboptimal and may not take the hybrid nature (or varying device capabilities) of the home network into consideration.

In some embodiments, a hybrid device can be configured to execute a total configuration algorithm (TCA) described herein so that the hybrid device configures itself automatically to form a home network (e.g., a P1905.1 hybrid communication network) with other network devices with minimal or zero user interventions. A configuration unit of the hybrid device can determine and control the behavior of a hybrid device during its initialization and its operation. In one embodiment (discussed in FIGS. 8-9), the configuration unit can employ a two-stage process to ensure that that is no duplication of master network device (e.g., registrar and CAP) functionality in the hybrid communication network. In the first stage, the hybrid device can transmit search messages to determine whether the hybrid communication network already comprises a master network device. During the first stage, the hybrid device can also listen for messages transmitted by other devices contending to become the master network device of the hybrid communication network. If the hybrid communication network does not comprise an existing master network device and if messages from network devices contending to become the master network device are not received, the hybrid device can proceed to the second stage where it periodically transmits its intent to become the master network device. If the hybrid device receives a message from another network device contending to become the master network device, the unique identifiers of the contending devices can be compared and one of the network devices (in one example, the network device with a lowest device identifier) can be selected as the master network device. If messages from network devices contending to become the master network device are not received, the hybrid device can be configured as the master network device (e.g., the registrar and the CAP) of the hybrid communication network.

In another embodiment (discussed in FIGS. 1-5), the configuration unit can split the process of selecting the coordinating functionality into two independent processes—a CAP selection process and a registrar selection process. The CAP selection process and the registrar selection process may be executed in parallel or sequentially. In the CAP selection process, the hybrid device can transmit advertisement messages (including a device weight associated with the hybrid device) in the hybrid communication network. The hybrid device can also receive advertisement messages from other network devices contending to become the CAP. The device weights associated with all the network devices contending to become the CAP can be compared and one of the network devices can be selected as a CAP (e.g., based on the device weights and/or unique identifiers of the network devices). Furthermore, the registrar selection process can be initiated (e.g., by the CAP or another network device) to elect the registrar of the hybrid communication network, as will be described with reference to FIGS. 6-7. The CAP can become the registrar of the hybrid communication network, if an existing registrar cannot be identified. Automatic selection of the CAP and the registrar can ensure that the hybrid communication network comprises a single CAP and a single registrar. The use of weight factors can enable a finer control over which network device should be configured as the CAP and the registrar. Automatic configuration of the hybrid device can enable good/reliable connectivity to the hybrid device, configure access points in the hybrid communication network to use different communication channels (if possible), maximize WLAN coverage (and connectivity) in the hybrid communication network (e.g., a home network), and maximize the capacity of the hybrid communication network (e.g., WLAN coverage may be provided everywhere in the home network). The automatic configuration of the hybrid device can enable the user to plug in (or connect) the hybrid devices in random order and in unpredictable locations. The hybrid devices can self-organize among themselves to discover each other and configure themselves without user intervention.

FIG. 1 depicts an example hybrid communication network 100 including a mechanism for selecting coordinating functionality (e.g., a CAP and a registrar) of the hybrid communication network 100. The hybrid communication network 100 comprises hybrid devices 102, 118, and 120, a legacy WLAN device 122, and a network gateway 124. The hybrid device 102 comprises a communication unit 104. The communication unit 104 comprises a configuration unit 106. The hybrid devices 102, 118, and 120 comprise multiple network interfaces that utilize a plurality of communication protocols (which may also be referred to as access technologies) to couple the hybrid device 102 to a plurality of communication networks. For example, as depicted in FIG. 1, the hybrid device 102 comprises four network interfaces—an Ethernet interface 110, a PLC interface 112, a WLAN client station ("WLAN STA") interface 114, and a WLAN access point ("WLAN AP") interface 116. It is noted that the hybrid devices 102, 118, and 120 can comprise any suitable number and type of network interfaces. The legacy WLAN device 122 comprises a single WLAN interface that couples the legacy WLAN device to the WLAN segment. It is noted, however, that the hybrid communication network 100 can comprise other suitable types of legacy network devices that comprise a single type of network interface that couple the legacy network device to a corresponding single communication network segment (or access technology). In the specific example of FIG. 1, the Ethernet interface 110 of the hybrid device 102 is coupled with an Ethernet interface (not shown) of the hybrid device 118 and with the network gateway 124. The network gateway 124 couples the hybrid communication network 100 (e.g., a home network) to an external communication network (e.g., the Internet). In the specific example of FIG. 1, the PLC interface 112 of the hybrid device 102 is coupled with a PLC interface (not shown) of the hybrid device 118 and a PLC interface (not shown) of the hybrid device 120. The WLAN STA interface 114 of the hybrid device 102 is coupled with a WLAN AP interface (not shown) of the hybrid device 120, while the WLAN AP interface 116 of the hybrid device 102 is coupled with the legacy WLAN device 122 (e.g., configured as a client station).

The hybrid devices 102, 118, and 120 can each be electronic devices configured to implement a plurality of communication protocols or access technologies, such as a laptop computer, a tablet computer, a mobile phone, a smart appliance, a gaming console, an access point, a desktop computer, or other suitable electronic devices. Although not depicted in FIG. 1, the hybrid devices 118 and 120 can also comprise a communication unit and a configuration unit, as depicted with reference to the hybrid device 102. Likewise, the legacy WLAN device 122 can be an electronic device configured to implement a single communication protocol or access technology, such as a laptop computer, a tablet computer, a mobile phone, a smart appliance, a gaming console, an access point, a desktop computer, or other suitable electronic device. In some embodiments, the communication unit of the hybrid devices 102, 118, and 120 and the legacy WLAN device 122 can each be implemented on a system-on-a-chip (SoC), an application specific integrated circuit (ASIC), or another suitable integrated circuit to enable network communications on their respective network device. In some embodiments, the communication units may each comprise one or more processors and memory, and may each be implemented in one or more integrated circuits on one or more circuit boards of their respective network device.

Each hybrid device in the hybrid communication network 100 can be configured as: 1) a central access point (CAP) of the hybrid communication network, or 2) a standby CAP that is not the CAP but is capable of becoming the CAP if the existing CAP fails or is disabled, or 3) a non-CAP that is neither a CAP nor a standby CAP. Additionally, the hybrid device may further be selected as: 1) a registrar of the hybrid communication network, or 2) a standby registrar that is not the active registrar but is capable of becoming the active registrar if the existing registrar fails or disappears from the network. In some embodiments, when a hybrid device (e.g., the hybrid device 102) is connected in the hybrid communication network 100, the hybrid device 102 (e.g., the configuration unit) can determine whether to become the CAP and/or a registrar of the hybrid communication network. Various operations for CAP and/or registrar selection in the hybrid communication network can be executed, as will be further discussed below.

In some implementations, the communication unit 106 transmits one or more advertisement messages including a device weight to contend to become a CAP of the hybrid communication network. The configuration unit 106 can first determine whether the hybrid device 102 should contend to become the CAP of the hybrid communication network 100. The CAP can be a hybrid device that is coupled to the network gateway 124 of the hybrid communication network 100 via a single communication medium. In some embodiments, the CAP (and the standby CAP) may always be directly connected to (e.g., 1-hop away from or 1 communication link away from) the network gateway 124 of the hybrid communication network 100. In one example, the CAP can be a hybrid device that communicatively couples to the network gateway 124 via the Ethernet interface 110 and across an Ethernet segment of the hybrid communication network 100. It is noted that in other embodiments, the CAP can be directly coupled to (e.g., 1-hop away from or 1 communication link away from) the network gateway 124 via any suitable network interface (e.g., a PLC interface) via the corresponding network segment (e.g., the PLC network segment) of the hybrid communication network 100. In general, the CAP can be a hybrid device that is directly coupled to (e.g., 1-hop away from or 1 communication link away from) an external network (e.g., Internet). In some embodiments, the network gateway 124 can be a network device that connects the hybrid communication network 100 (e.g., the home network) to an external network (e.g., that provides Internet access to the home network). For example, if the hybrid communication network 100 is a home network, the CAP can be a home router that directly connects to the network gateway 124 (e.g., a home router with WLAN communication capabilities, which may also support other wireless/wired communication technologies, such as PLC). The CAP can serve as the anchor point for constructing WLAN topologies. In the example of FIG. 1, because the hybrid device 102 is coupled with the gateway 124 of the hybrid communication network 100 via the Ethernet segment, the configuration unit 106 can determine that the hybrid device 102 should contend to become the CAP of the hybrid communication network 100. However, if the hybrid device is not coupled with the network gateway 124 via a single communication medium, the configuration unit 106 can determine that the hybrid device 102 is a non-CAP device and should not contend to become the CAP of the hybrid communication network 100. After determining that the hybrid device 102 can contend to become the CAP, the communication unit 104 can transmit one or more advertisement messages (e.g., election advertisement (EA) messages) including the device weight associated with the hybrid device 102. In some embodiments, the device weight associated with the hybrid device 102 can be determined based, at least in part, on a number of WLAN communication bands on which the hybrid device 102 can operate as an access point, whether the hybrid device 102 is coupled with the network gateway 124, device capabilities (e.g., radio configuration), communication link speed, and other such factors, as will be further described above with reference to FIGS. 2 and 6. It is noted that in some embodiments, the hybrid device 102 can transmit broadcast advertisement messages or multicast advertisement messages to one or more network devices in the hybrid communication network 100. Specifically, in transmitting the advertisement messages, the hybrid device 102 can ensure that all the network devices that are configured to execute the operations described herein receive the advertisement messages.

The device weights associated with the hybrid devices contending to become the CAP are compared. After transmitting the advertisement messages (as discussed above), the communication unit 104 can listen for advertisement messages transmitted by other hybrid devices contending to become the CAP. For example, the hybrid devices 118 and 120 may transmit advertisement messages including their respective device weight. The configuration unit 106 can compare the device weights associated with the hybrid devices 102, 118, and 120 to identify one or more hybrid devices that are associated with the preferred (or best) device weight. In one example, the configuration unit 106 can identify one or more hybrid devices that are associated with the highest device weight. It is noted that if the communication unit 104 does not receive advertisement messages from other hybrid devices within a predetermined time interval, the configuration unit 106 can designate the hybrid device 102 as the CAP of the hybrid communication network 100.

If only one of the hybrid devices contending to become the CAP is associated with the preferred (or best) device weight, this hybrid device with the preferred device weight is selected as the CAP. For example, if the hybrid device 102 is associated with the preferred device weight, the hybrid device 102 can be selected as the CAP of the hybrid communication network 100. However, if two or more of the hybrid devices contending to become the CAP are associated with the preferred device weight, the hybrid device with the preferred device weight and the preferred (or best) device identifier is selected as the CAP. For example, if two or more of the hybrid devices contending to become the CAP are associated with the highest device weight, the hybrid device with the highest device weight and the lowest device identifier is selected as the CAP. With reference to the example of FIG. 1, if the hybrid devices 102 and 118 are both associated with the preferred device weight, the configuration unit 106 can compare the device identifiers (e.g., medium access control (MAC) address, hybrid networking layer address, etc.) of the hybrid devices 102 and 118. The hybrid device associated with the preferred device identifier (e.g., the hybrid device 118) can be selected as the CAP of the hybrid communication network 100. Operations for selecting the CAP of the hybrid communication network 100 will be described in further detail with reference to FIGS. 2-5. After the CAP is selected, the configuration unit 106 can determine operating parameters of the CAP. The operating parameters can comprise a communication band (e.g., a 2.4 GHz WLAN communication band, 5 GHz WLAN communication band, etc.) in which the CAP should operate, a communication channel in the selected communication band in which the CAP should operate, and a transmit power with which the CAP should transmit messages in the hybrid communication network 100.

In some embodiments, a registrar of the hybrid communication network 100 can also be elected. In one implementation, the registrar of the hybrid communication network 100 can be elected after the CAP of the hybrid communication network is selected. In another implementation, the operations for electing the registrar of the hybrid communication network 100 can be independent of the operations for electing the CAP of the hybrid communication network 100. The communication unit 104 can transmit one or more registrar search messages to determine whether the hybrid device 102 should be configured as the registrar of the hybrid communication network 100. For example, the hybrid device 102 can be configured as the registrar of the hybrid communication network 100 if the communication unit 104 does not receive any registrar search response messages within a predetermined time interval. The hybrid device 102 may not be configured as the registrar of the hybrid communication network 100 if the communication unit 104 receives one or more registrar search response messages.

It is noted that in some embodiments, if the hybrid device designated as the CAP comprises a WLAN STA (e.g., a WLAN module configured as a client station), then the WLAN STA may be disabled. In some embodiments, as will be described with reference to FIGS. 6-7, the hybrid device elected as the CAP may be different from the hybrid device elected as the P1905.1 Registrar of the hybrid communication network 100. In other embodiments, as will be described with reference to FIGS. 1-5 and 8-9, the hybrid device elected as the CAP may also be elected as the P1905.1 Registrar of the hybrid communication network 100. However, with reference to FIGS. 1-5, the hybrid device elected as the CAP may not be elected as the registrar if the hybrid communication network comprises a statically configured registrar. In some embodiments, one or more of the TCA-capable hybrid devices in the hybrid communication network 100 may be configured to execute the operations for CAP and/or registrar election described herein.

In some embodiments, if the hybrid device 102 is the CAP and a standby registrar, the hybrid device 102 can periodically (or continuously) determine whether the active registrar is still part of the hybrid communication network 100. If the active registrar leaves the hybrid communication network 100 (e.g., is switched OFF, etc.), the hybrid device 102 (configured as the CAP and the standby registrar) can become the registrar of the hybrid communication network 100. In some embodiments, if the hybrid device 102 is the standby CAP and the registrar of the hybrid communication network 100, the hybrid device 102 can periodically check whether another network device (e.g., a non-TCA capable device or a statically configured network device) has joined the hybrid communication network as a registrar. In some embodiments, if the hybrid device 102 is the standby CAP and the standby registrar of the hybrid communication network 100, the hybrid device 102 can periodically check whether it can become the CAP of the hybrid communication network 100. However, it is noted that the hybrid device 102 may attempt to become the registrar of the hybrid communication network (e.g., transmit one or more registrar search messages) only after the hybrid device 102 becomes the CAP of the hybrid communication network 100. Although, the hybrid device may have to be an active CAP to become an active registrar of the hybrid communication network 100, the hybrid device need not remain the active CAP after the hybrid device 102 becomes the active registrar. In other words, the hybrid device 102 can remain the active registrar of the hybrid communication network 100 even if the hybrid device 102 switches from the active CAP state to the standby CAP state.

Figure 2:
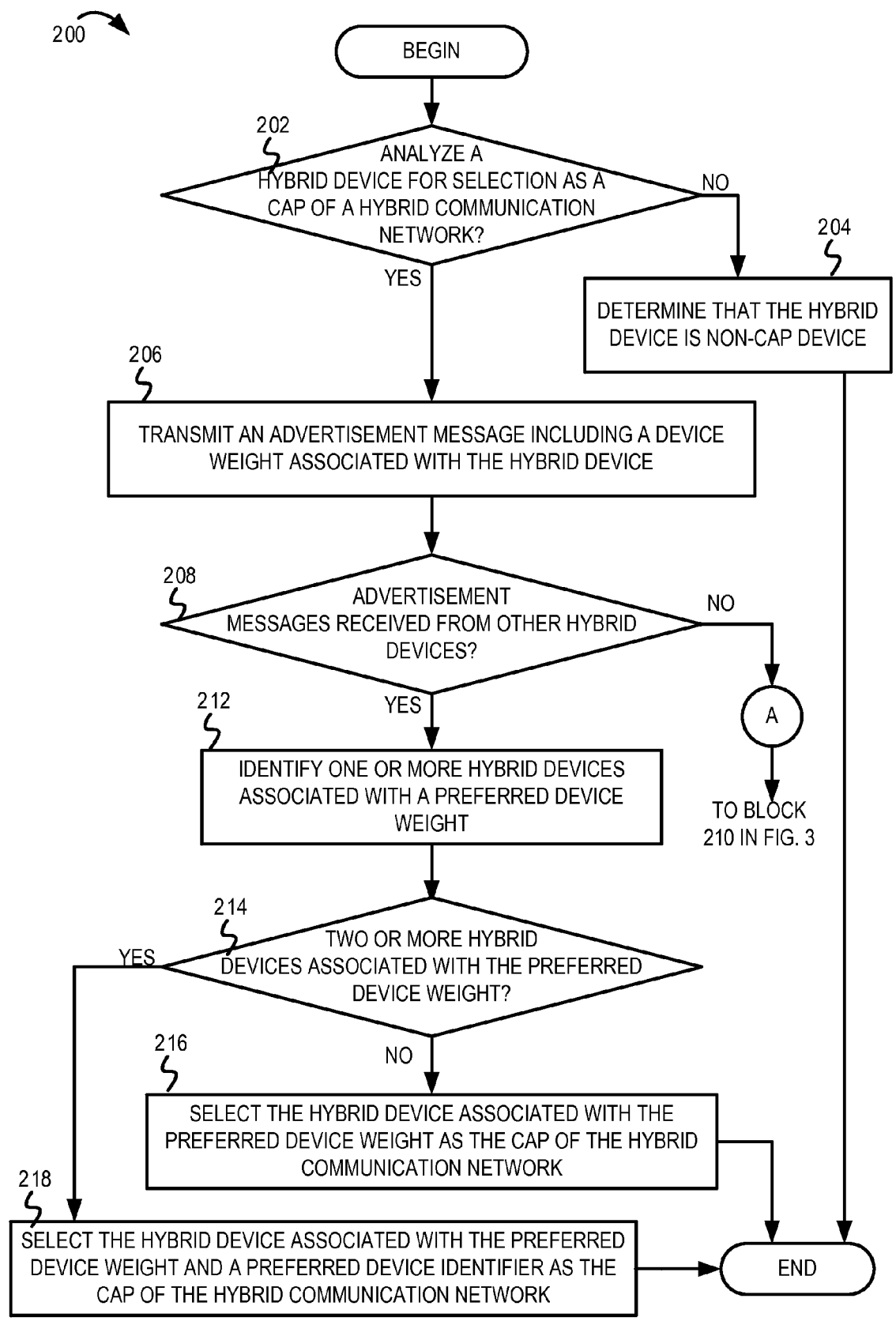
FIG. 2 is a flow diagram illustrating example operations for electing a central access point and a registrar in a hybrid communication network.
Figure 3:
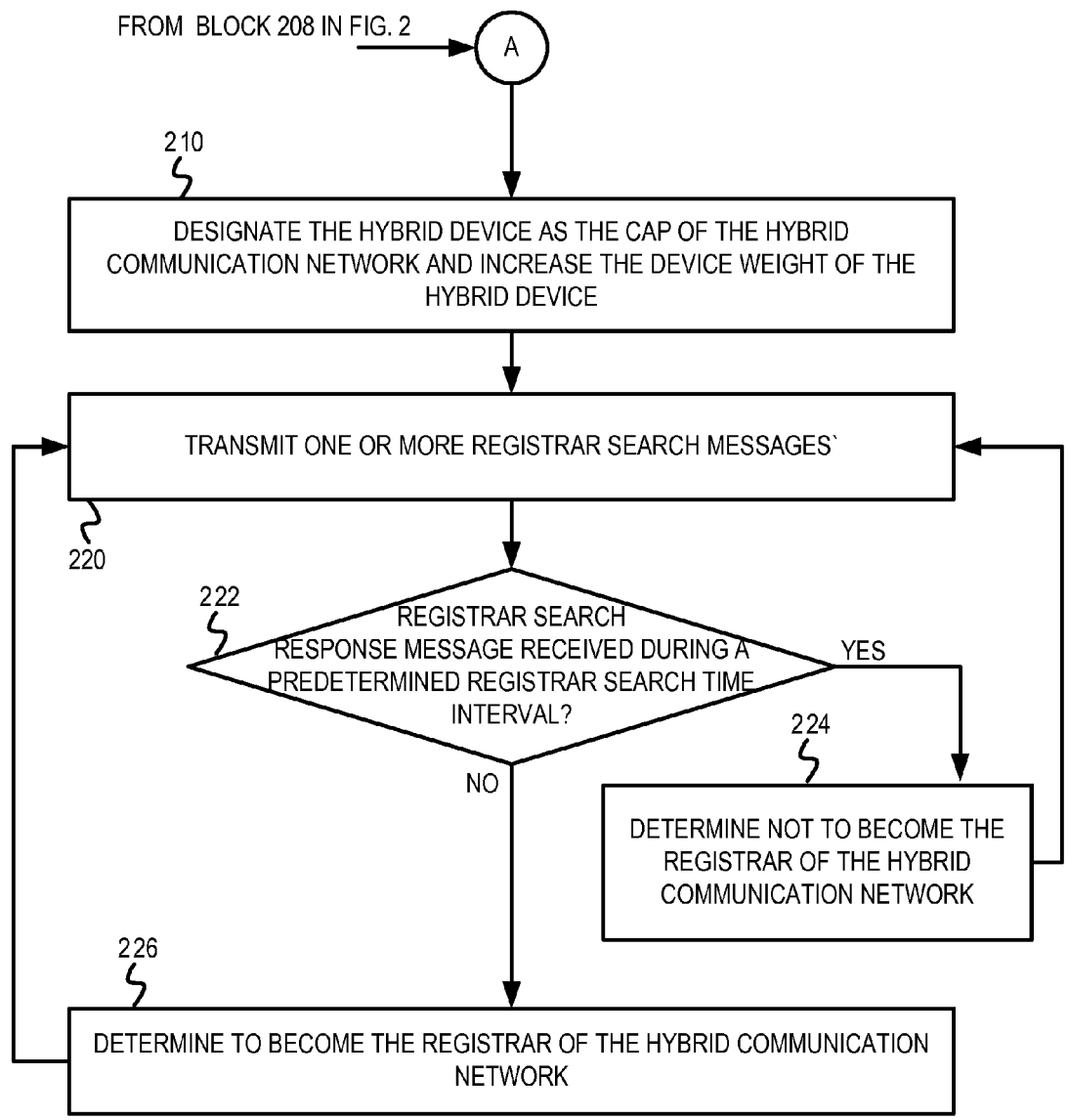
FIG. 3 is a continuation of FIG. 2 and illustrates example operations for electing a central access point and a registrar in a hybrid communication network.

FIG. 2 and FIG. 3 depict a flow diagram ("flow") 200 illustrating example operations for electing a central access point and a registrar in a hybrid communication network. The flow 200 begins at block 202 in FIG. 2.

At block 202, it is determined whether the hybrid device should be analyzed for selection as a CAP of a hybrid network. In one embodiment, with reference to the example of FIG. 1, the configuration unit 106 can determine whether the hybrid device 102 is capable of becoming the CAP (if selected) of the hybrid communication network 100. For example, the configuration unit 106 can determine whether an Ethernet interface 110 of the hybrid device 102 is communicatively coupled with the network gateway 124 of the hybrid communication network 100 via the Ethernet segment. If the Ethernet interface 110 of the hybrid device 102 is communicatively coupled with the network gateway 124, the configuration unit 106 can determine that the hybrid device 102 should contend to become the CAP of the hybrid communication network 100. It is noted that in other embodiments, the CAP can be directly coupled to (e.g., 1-hop away from or 1 communication link away from) the network gateway 124 via any suitable network interface (e.g., a PLC interface). In general, it may be determined whether the hybrid device 102 is directly coupled to (e.g., 1-hop away from or 1 communication link away from) an external network (e.g., Internet). As another example, the configuration unit 106 may also analyze one or more communication capabilities of the hybrid device 102 (e.g., operating communication bands, data communication rate, etc.) to determine whether the hybrid device 102 should contend to become the CAP of the hybrid communication network 100. In some embodiments, to determine whether the hybrid device 102 should contend to become the CAP, the configuration unit 106 can determine whether a DHCP server is detected on the Ethernet interface 110 (or another suitable network interface) of the hybrid device 102. In some embodiments, a background process of the configuration unit 106 can monitor the connections on the Ethernet interface 110 and can provide a notification (to the configuration unit 106) if a DHCP server is reachable from the Ethernet interface 110 of the hybrid device 102. In some embodiments, the hybrid device 102 (e.g., the communication unit 104) can transmit one or more DHCP discover messages during a predetermined time interval. The hybrid device 102 can wait to receive a response message (e.g., a DHCP offer message). If the hybrid device 102 receives a DHCP offer message within a predetermined response time interval, the hybrid device 102 can infer that a DHCP server is coupled to the Ethernet interface 110 of the hybrid device 102. However, if the hybrid device 102 does not receive a DHCP offer message within the predetermined response time interval, the hybrid device 102 can infer that a DHCP server is not coupled to the Ethernet interface 110 of the hybrid device 102. If it is determined that the hybrid device should contend to become the CAP, the flow continues at block 206. Otherwise, the flow continues at block 204.

At block 204, the hybrid device is designated as a non-CAP device. The flow 200 moves from block 202 to block 204 if it is determined that the hybrid device 102 should not contend to become the CAP. For example, the hybrid device may not contend to become the CAP if the Ethernet interface 110 of the hybrid device 102 is not communicatively coupled with the network gateway 124 of the hybrid communication network 100 via the Ethernet segment. Accordingly, the hybrid device 102 can be designated as a non-CAP device. From block 204, the flow ends.

At block 206, an advertisement message including a device weight associated with the hybrid device is transmitted. The flow 200 moves from block 202 to block 206 if it is determined that the hybrid device should contend to become the CAP. The configuration unit 106 can then execute duplicate CAP detection operations to determine whether the hybrid communication network 100 already comprises an active CAP and to prevent the existence of multiple CAPs in the hybrid communication network 100. As discussed above with reference to FIGS. 1-2, after determining that the hybrid device 102 should compete to become the CAP of the hybrid communication network 100, the hybrid device 102 can transmit one or more advertisement messages (e.g., EA messages) to other network devices of the hybrid communication network 100. The advertisement messages can comprise a device weight assigned to the hybrid device 102. In some embodiments, each TCA-capable hybrid device can be assigned a device weight during startup. In one example, the configuration unit 106 can calculate the device weight of the hybrid device 102 based, at least in part, on a link status to the gateway 124 of the hybrid communication network 100, internal state changes, and other suitable factors. In some embodiments, the device weight of the hybrid device 102 can be adjusted (e.g., by a suitable factor) if the hybrid device 102 was the CAP the last time the hybrid device 102 was booted, if the hybrid device 102 is currently the CAP of the hybrid communication network 100, etc. For example, the device weight of the hybrid device 102 can be increased (e.g., by a suitable increment) if the hybrid device 102 was the CAP the last time the hybrid device 102 was booted, if the hybrid device 102 is currently the CAP of the hybrid communication network 100, etc. In other examples, however, the device weight of the hybrid device 102 can be decreased by a suitable factor or varied in accordance with other suitable algorithms. The flow continues at block 208.

At block 208, it is determined whether advertisement messages were received from one or more other hybrid devices during a predetermined time interval. Each of the hybrid devices that are competing to become the CAP of the hybrid communication network can transmit advertisement messages and can include their respective device weight. In some embodiments, the hybrid device 102 can wait for a predetermined CAP search time interval to receive advertisement messages from other hybrid devices in the hybrid communication network. If the hybrid device 102 does not receive any advertisement messages from other hybrid devices during the predetermined CAP search time interval, the flow continues at block 210 in FIG. 3. Otherwise, if the hybrid device receives advertisement messages from one or more other hybrid devices during the predetermined CAP search time interval, the flow continues at block 212.

At block 212, one or more hybrid devices associated with a preferred device weight are identified. The flow moves from block 208 to block 212 if the hybrid device receives advertisement messages from one or more other hybrid devices during the predetermined CAP search time interval. For example, the configuration unit 106 can compare the device weights associated with each of the hybrid devices that transmitted the advertisement messages and can identify one or more hybrid devices with a highest device weight. After identifying one or more hybrid devices associated with the preferred device weight, the flow continues at block 214.

At block 214, it is determined whether two or more hybrid devices are associated with the preferred device weight. For example, the configuration unit 106 can determine whether two or more hybrid devices are associated with the preferred device weight (indicated in their respective advertisement messages). If only one hybrid device is associated with the preferred device weight, the flow continues at block 216. Otherwise, if two or more hybrid devices are associated with the preferred device weight, the flow continues at block 218, where the hybrid devices are further analyzed to select the CAP.

At block 216, the hybrid device associated with the preferred weight is selected as the CAP of the hybrid communication network. The flow 200 moves from block 214 to block 216 if only one hybrid device (e.g., the hybrid device 120) is associated with the preferred device weight (indicated in the advertisement message transmitted by the hybrid device 120). The configuration unit 106 can indicate (e.g., to other processing units of the hybrid device 102) that the hybrid device 120 is the active CAP of the hybrid communication network 100. Subsequent transmissions and measurements to the CAP can be executed with the hybrid device 120. From block 216, the flow ends.

At block 218, a hybrid device associated with a preferred device weight and a preferred device identifier is selected as the CAP of the hybrid communication network. The flow 200 moves from block 214 to block 218 if two or more hybrid devices are associated with the preferred device weight. The configuration unit 106 can determine a device identifier (e.g., a MAC address, a hybrid networking layer address, a network interface address, or another unique identifier) associated with each of the two or more hybrid devices with the selected device weight. The configuration unit 106 can compare the device identifier associated with the two or more hybrid devices and can identify the hybrid device associated with a preferred device identifier (e.g., the hybrid device 120). In one example, the hybrid device with the highest weight and the lowest device identifier can be selected as the CAP. It is noted that other suitable techniques or combinations of techniques can be employed to select the CAP. The configuration unit 106 can indicate (e.g., to other processing units of the hybrid device 102) that the hybrid device 120 is the CAP of the hybrid communication network 100. Subsequent transmissions and measurements to the CAP can be executed with the hybrid device 120. From block 218, the flow ends.

At block 210 in FIG. 3, the hybrid device is designated as the CAP of the hybrid communication network. The flow moves from block 208 in FIG. 2 to block 210 in FIG. 3 if the hybrid device 102 does not receive advertisement messages from other hybrid devices during the predetermined CAP search time interval. Although not depicted in FIGS. 2-3, it should also be noted that if the hybrid device 102 is selected as the CAP of the hybrid communication network 100 at blocks 216 or 218, the flow 200 can move from blocks 216 or 218 to block 210. Here, the configuration unit 106 can assume that no other hybrid devices in the hybrid communication network 100 can operate as the CAP. Accordingly, the configuration unit 106 can designate the hybrid device 102 as the CAP of the hybrid communication network 100. After the hybrid device 102 becomes the CAP of the hybrid communication network 100, the hybrid device 102 can adjust (e.g., increase) its device weight by a predetermined weight-boosting factor. This can ensure that the hybrid device 102 does not relinquish its role as CAP to a new hybrid device with the same (previous) weight as the hybrid device 102. In some embodiments, the hybrid device 102 can transmit one or more notification messages indicating that it is the CAP of the hybrid communication network 100.

In some embodiments, after becoming the CAP of the hybrid communication network, the configuration unit 106 may determine one or more operating parameters of the hybrid device 102. For example, the configuration unit 106 can determine the communication band (e.g., 2.4 GHz WLAN band, 5 GHz WLAN band, etc.) on which the CAP should operate, a communication channel within the communication band on which the CAP should operate, transmit power for WLAN transmissions, etc. In some embodiments, after the hybrid device 102 becomes the CAP, the configuration unit 106 can automatically determine WLAN credentials for each WLAN communication band in which the CAP 102 is configured to operate (e.g., the CAP can select an SSID, generate a random WLAN passphrase, etc.). In some embodiments, the WLAN credentials may be configured for the 2.4 GHz band and the 5 GHz band irrespective of whether the CAP is configured to operate only in a single communication band. In one example, the CAP may be configured so that the WLAN AP of the hybrid device is switched ON and the WLAN STA of the hybrid device is switched OFF (e.g., it is assumed that the WLAN STA need not be switched ON because the hybrid device is directly connected to the network gateway 124). In addition, the CAP can also operate in conjunction with other network devices (e.g., hybrid devices, legacy devices, etc.) to determine how to configure the other network devices (e.g., whether to enable or disable a WLAN AP module and/or a WLAN STA module of the other network devices). The flow continues at block 220, where the hybrid device 102 contends to become the registrar of the hybrid communication network 100.

At block 220, the hybrid device transmits one or more registrar search messages. After the hybrid device 102 becomes the CAP of the hybrid communication network 100, the hybrid device 102 can attempt to become the registrar of the hybrid communication network 100. For example, the hybrid device 102 can transmit an AP auto-config search message every predetermined time interval. The flow continues at block 222.

At block 222, it is determined whether a registrar search response message was received during a predetermined registrar search time interval. For example, the hybrid device 102 can determine whether it has received an AP auto-config response message or an AP auto-config renew message during the predetermined registrar search time interval. If it is determined that a registrar search response message was received during the predetermined registrar search time interval, the flow continues at block 224. Otherwise, the flow continues at block 226.

At block 224, the hybrid device determines not to become the registrar of the hybrid communication network. If it is determined that a registrar search response message was received during the predetermined registrar search time interval, the configuration unit 106 can infer that the hybrid communication network 100 comprises an active registrar. Here, the hybrid device can be configured as a standby registrar of the hybrid communication network 100. From block 224, the flow loops back to block 220 where the hybrid device 102 continues to determine whether the hybrid communication network comprises an active registrar. The hybrid device can become the active registrar if the current active registrar is no longer in the hybrid communication network 100 and if the hybrid device is the active CAP of the hybrid communication network 100.

At block 226, the hybrid device determines to become the registrar of the hybrid communication network. If it is determined that a registrar search response message was not received during the predetermined registrar search time interval, the configuration unit 106 can infer that the hybrid communication network 100 does not comprise an active registrar. Accordingly, the hybrid device 102 can switch to an active registrar state and can become the registrar of the hybrid communication network 100. From block 226, the flow loops back to block 220 where the hybrid device 102 continues to determine whether the hybrid communication network 100 comprises another active registrar. The hybrid device can become a standby registrar if the hybrid device detects another active registrar. The hybrid device can become the active registrar again if the active registrar is no longer in the hybrid communication network 100 and if the hybrid device is the active CAP of the hybrid communication network 100.

Although not depicted in FIGS. 2-3, it is noted that if the hybrid device 102 is selected as the CAP of the hybrid communication network 100 (e.g., at blocks 216 or 218), the flow can continue to block 210 in FIG. 3 where the device weight of the hybrid device 102 can be adjusted and the hybrid device 102 attempt to become the registrar of the hybrid communication network 100.

Although not depicted in FIGS. 2-3, it is noted that after the hybrid device 102 becomes the CAP of the hybrid communication network 100 and adjusts its device weight, the hybrid device 102 (e.g., the configuration unit 106) can continuously (or periodically) monitor the device weights in advertisement messages received from other network devices in the hybrid communication network 100. If the configuration unit 106 receives an advertisement message with a device weight that is preferred compared to the device weight (varied/adjusted at block 210) of the hybrid device 102, the hybrid device 102 can become a standby CAP and can attempt to identify a new CAP of the hybrid communication network 100.

As discussed above in FIGS. 2-3, the CAP may detect another network device with a device weight that is preferred compared to the CAP's device weight or may detect another network device with a device weight that is equal to the CAP's device weight but with a device identifier that is preferred compared to the CAP's device identifier. In this scenario, the CAP can switch to the standby CAP state. The network device with a device weight and/or a device identifier that is preferred compared to the device weight and/or device identifier of the current CAP (or active CAP) can contend to become the new CAP of the hybrid communication network. This is further illustrated in sequence diagram 400 of FIG. 4. A first network device 402 becomes the CAP of the communication network at stage 408 (e.g., after executing the operations described above in FIGS. 2 and 3). A second network device 406 with a device weight that is preferred compared to the CAP's device weight joins the communication network (see stage 410). The first network device 402 and the second network device 406 communicate with each other and with other network devices of the communication environment (depicted as "ENV 404" in FIG. 4). The CAP 402 transmits an advertisement message 414 (e.g., an EA(CAP) message) to indicate that it is the CAP of the communication network. The second network device 406 detects the CAP (i.e., the first network device 402) in the communication network and switches to a standby CAP state (see stage 412). The second network device 406 determines that its device weight is preferred compared to the device weight of the current CAP 402 and also transmits an advertisement message 416A including the device weight of the second network device (e.g., a EA(Standby CAP, preferred weight) message) to attempt to become the CAP of the communication network. The current CAP 402 detects the EA(Standby CAP, preferred weight) message 416A from the second network device 406, determines that the second network device 406 should be the CAP of the communication network (e.g., based on the comparatively preferred device weight), and switches to a standby CAP state (see stage 418). In one embodiment, the second network device 406 can transmit the advertisement message a predetermined number of times (depicted as advertisement messages 416A, 416B, and 416C) and can wait for a predetermined time interval to receive a response to the advertisement messages. If the predetermined time intervals elapse and the second network device 406 does not detect another advertisement message with a comparatively preferred device weight, the second network device 406 transmits a notification message 418 (e.g., a EA(CAP) message) to indicate that it is the CAP of the hybrid communication network. The second network device 406 then becomes the active CAP of the communication network (see stage 420).

Figure 4:
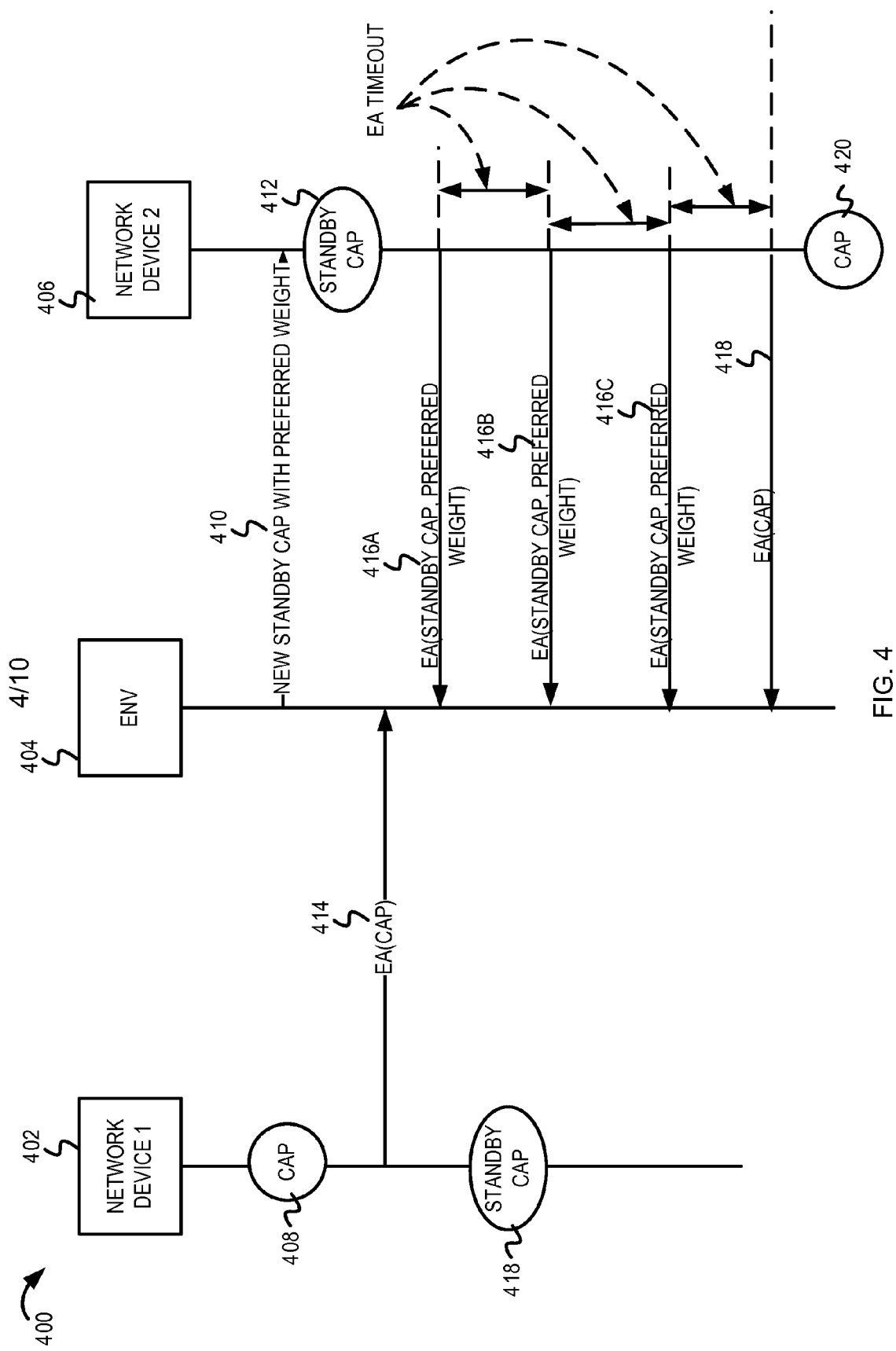
FIG. 4 is an example sequence diagram illustrating one embodiment for selecting a central access point in a communication network.

In accordance with the example of FIG. 4, the current CAP (i.e., the first network device 402) detects that the device weight of the second network device 406 is preferred compared to the CAP's device weight. Accordingly, the current CAP 402 immediately switches to the standby CAP state. However, the second network device 406 waits for a predetermined time interval to ensure that the second network device 406 has the preferred device weight in the hybrid communication network before it becomes the active CAP. Depending on the value of the EA timeout, the duration for which the communication network does not have an active CAP may be long. The operations for enabling a new network device to become the active CAP of the communication network can be optimized to reduce the time interval for which the communication network is in-between CAPs (e.g., the time interval between a current CAP switching to the standby CAP state and another network device becoming a new CAP of the communication network). The sequence diagram 500 of FIG. 5 will now illustrate example operations for optimizing the CAP election process to reduce the time interval for which the communication network does not have a CAP (because of switching from a current CAP to a new CAP).

Figure 5:
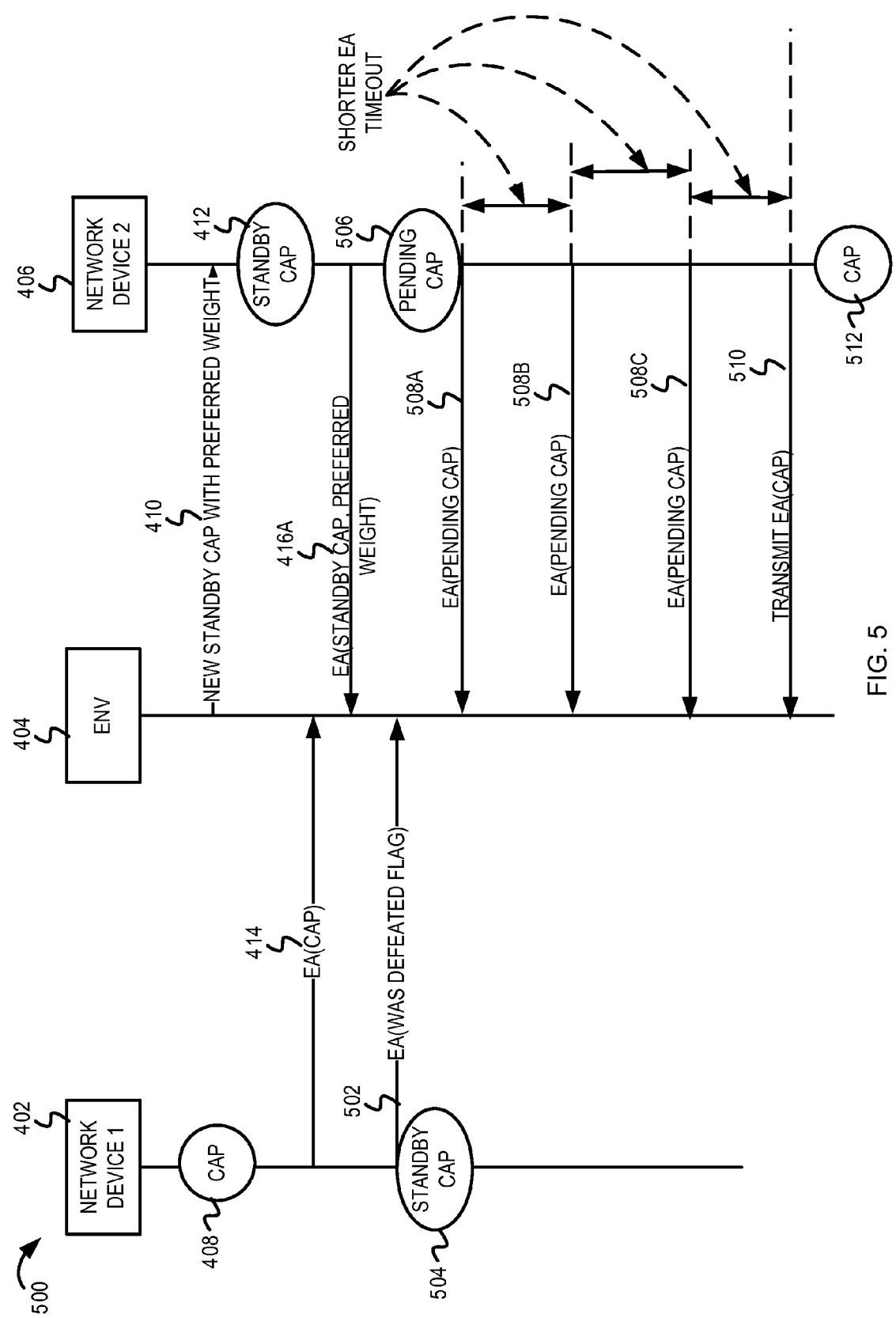
FIG. 5 is a continuation of FIG. 4 and illustrates example operations for optimizing a process for selecting the central access point in a communication network.

As discussed above with reference to FIG. 4, the second network device 406 joins the communication network (see stage 410), becomes a standby CAP (see stage 412), and transmits the EA(StandBy CAP, preferred weight) message 416A. When the current CAP 402 receives an advertisement message that indicates that the device weight of second network device 406 is preferred compared to the CAP's device weight (or the same as the CAP's device weight with a comparatively preferred device identifier), the current CAP 402 can transmit an advertisement message that indicates that it was the previous CAP of the communication network and can then switch to the standby CAP state. In other words, when the current CAP 402 receives an advertisement message that indicates that the second network device 406 has a device weight (and/or device identifier) that is preferred compared to the device weight (and/or device identifier) of the current CAP 402, the current CAP can transmit an advertisement message indicating that it was the previous CAP of the communication network and can then switch to the standby CAP state. As depicted in FIG. 5, after the current CAP 402 detects the EA(StandBy CAP, preferred weight) message 416A from the second network device 406, the current CAP 402 can transmit a EA(wasDefeated) message 502. The wasDefeated parameter can be one or more bits (e.g., a flag) that are set (by the current CAP 402) to indicate that the current CAP 402 is relinquishing its status as CAP because another network device with a comparatively preferred device weight was detected. The current CAP 402 then switches to the standby CAP state (see stage 504). If the standby CAP (e.g., the second network device 406) receives the EA(wasDefeated) message 502, the standby CAP 406 can determine whether its device weight (and/or device identifier) is preferred compared to the current CAP 402 that was defeated. The standby CAP 406 can switch to a "pending CAP" state (see stage 506) and can attempt to become the CAP of the communication network. The standby CAP, after switching to the pending CAP mode, is herein referred to as a "pending CAP." In other words, the pending CAP can be a network device that has the preferred device weight in the communication network. The pending CAP will become the active CAP if the pending CAP's device weight is preferred compared to the device weight of all the other network devices (or if the pending CAP's device identifier is preferred compared to the device identifier of other network devices with the same preferred device weight as the pending CAP). After switching to the pending CAP state, the pending CAP 406 can speed-up the CAP election process by transmitting the advertisement messages more frequently. Specifically, the pending CAP 406 can transmit multiple advertisement messages (e.g., depicted as messages 508A, 508B, and 508C) announcing that it is the pending CAP (e.g., EA(pending CAP) messages), each separated by a shorter EA timeout interval (as compared to the EA timeout interval of FIG. 4). While transmitting its own EA(pending CAP) messages, the pending CAP 406 can continuously determine whether advertisement messages were received from other network devices with preferred device weights as compared to the pending CAP 406. If an advertisement message including a comparatively preferred device weight is received within a EA timeout interval, the pending CAP 406 can switch back to the standby CAP state and can transmit an advertisement message with the WasDefeated flag. However, if an advertisement message including a preferred device weight (as compared to the pending CAP's device weight) is not received within the EA timeout interval, the pending CAP 406 can infer that no other network device has a preferred device weight (or the same device weight with a preferred device identifier) as compared to the pending CAP 406. The pending CAP 406 can then transmit a notification message 510 (e.g., an EA(CAP) message) indicating that it is the new active CAP and can become the CAP of the communication network (see stage 512).

With reference to FIG. 5, configuring the current CAP and the pending CAP to transmit the EA(wasDefeated) message if another network device with a comparatively preferred device weight (and/or comparatively preferred device identifier) is detected indicates the presence of another network device with a preferred device weight and/or a preferred device identifier (as compared to the current CAP/pending CAP) in the communication network. Accordingly, a new network device contending to become the CAP of the communication network can compare its device weight against the device weight of the network device that was defeated ("defeated network device"). If the new network device has a preferred device weight as compared to the defeated network device, then the new network device can infer that the probability that another existing network device has a comparatively preferred device weight is low. Accordingly, the new network device can spend a shorter amount of time trying to detect an existing network device with a device weight that is preferred compared to that of the new network device, thus reducing the time interval during which the communication network is in-between CAPs.

With reference to FIG. 5, it is noted that if a non-CAP device receives the EA(wasDefeated) message, the non-CAP device can first determine whether the current CAP 402 transmitted the message (e.g., by comparing a device identifier of the device that transmitted the EA(wasDefeated) message against the device identifier of the current CAP). If it is determined that the current CAP 402 transmitted the EA(wasDefeated) message, the non-CAP device can infer that a new network device will become the CAP of the communication network. After the new CAP is identified, the non-CAP device can execute one or more operations, such as analyzing communication channels to the new CAP, determining whether to reconfigure one or more communication modules of the non-CAP device, etc. If it is determined that the current CAP 402 did not transmit the EA(wasDefeated) message, the non-CAP device can infer that a pending CAP device was defeated (e.g., by a device with a device weight that is preferred compared to the device weight of the pending CAP device) and may not take any action.

Figure 6:
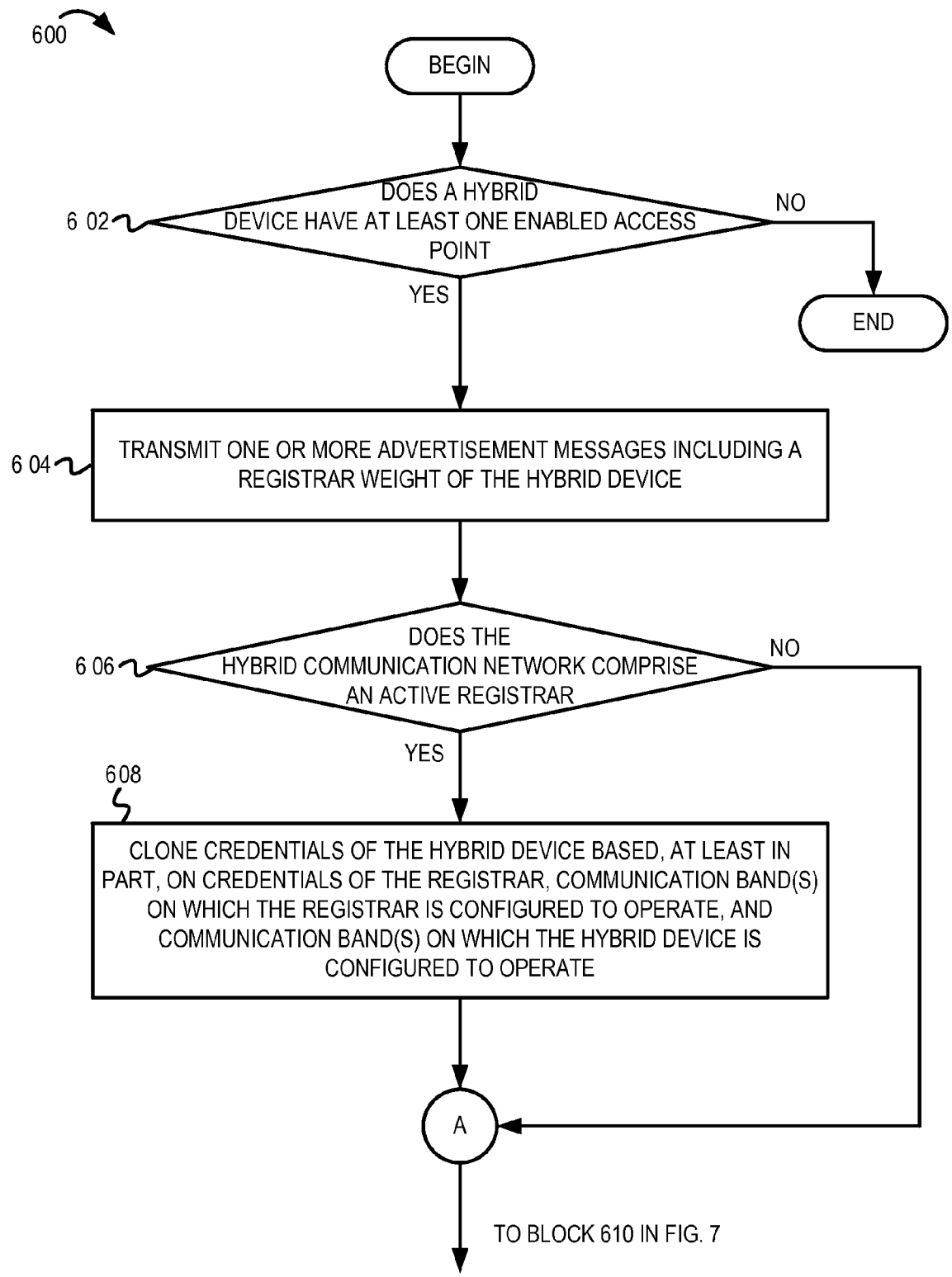
FIG. 6 is a flow diagram illustrating example operations for electing a registrar of communication network based on operating band capabilities of the network devices.
Figure 7:
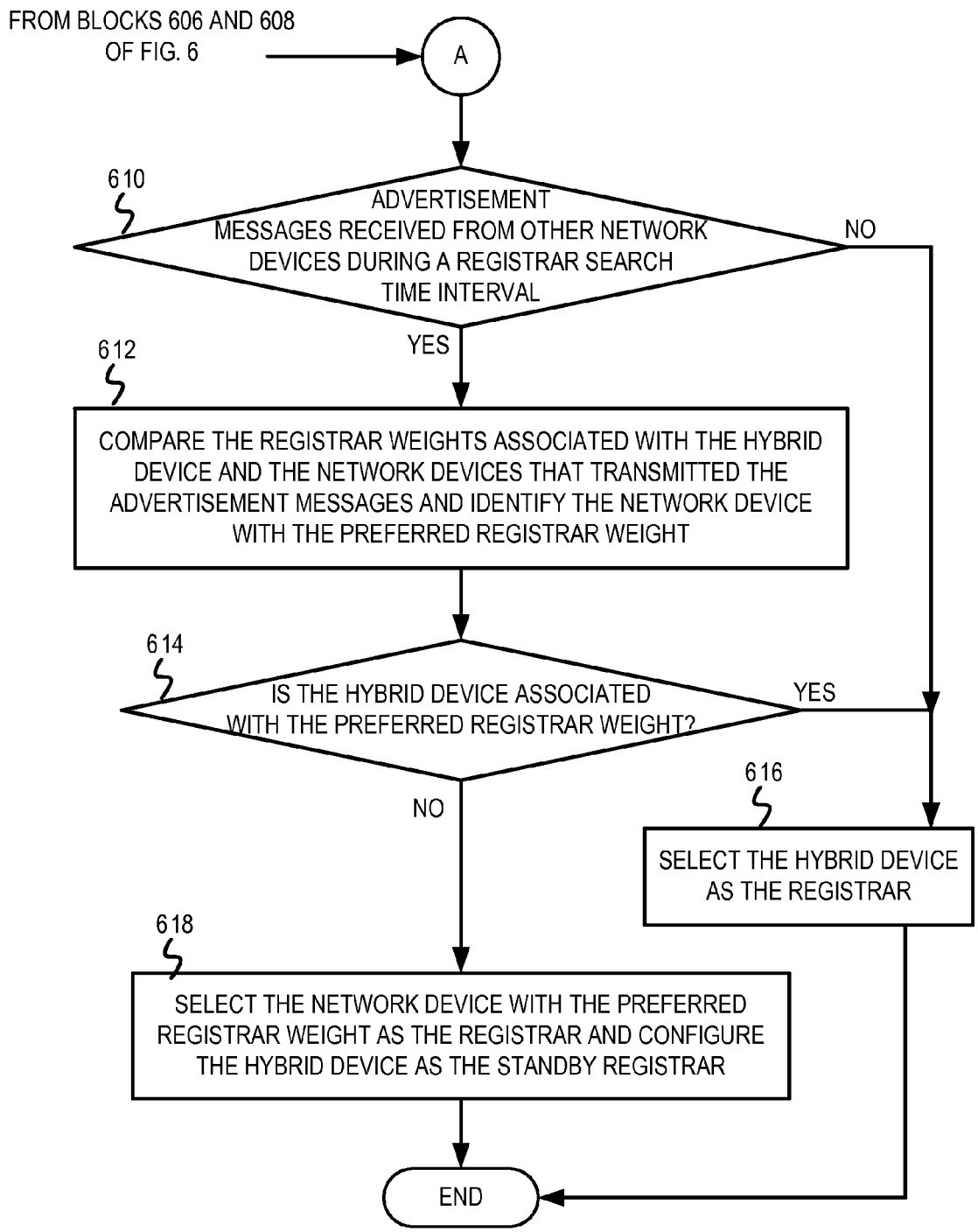
FIG. 7 is a continuation of FIG. 6 and illustrates example operations for electing a registrar of communication network based on operating band capabilities of the network devices.

In some embodiments, as discussed above with reference to FIGS. 1-5, a hybrid device may become the registrar of the hybrid communication network only if the hybrid device is currently configured as the CAP of the hybrid communication network, but the hybrid device may not remain the CAP after it becomes the registrar. Such a process for selecting the registrar (i.e., only when the hybrid device is configured as the CAP) can be limiting if the CAP is a single band device (e.g., operates only in one communication band, such as a 2.4 GHz WLAN band or a 5 GHz WLAN band but not both). In other words, the single band hybrid device may not be capable of providing operating credentials to those network devices that operate in another communication band (and/or to devices that operate in multiple communication bands). FIGS. 6-7 illustrate example operations for electing a registrar based on operating band capabilities of the network devices. For example, as will be described below, in accordance with the registrar election operations of FIG. 6, a dual band dual concurrent (DBDC) device (e.g., a network device with a simultaneously enabled 2.4 GHz WLAN AP and a 5 GHz WLAN AP) can be preferentially selected as a registrar over a single band network device (e.g., a network device with a 2.4 GHz WLAN AP or a 5 GHz WLAN AP).

FIG. 6 and FIG. 7 depict a flow diagram illustrating an embodiment for electing the registrar of the hybrid communication network. The flow 600 begins at block 602 in FIG. 6.

At block 602, it is determined whether a hybrid device of a hybrid communication network has at least one enabled access point. With reference to the example of FIG. 1, the configuration unit 106 can determine whether the hybrid device 102 comprises an enabled access point on at least one operating communication band. The hybrid device 102 may comprise a WLAN access point configured to operate on a 2.4 GHz WLAN band, a WLAN access point configured to operate on a 5 GHz WLAN band, and/or a WLAN access point configured to operate on other suitable WLAN bands. If it is determined that the hybrid device comprises at least one enabled access point, the flow continues at block 604. Otherwise, if it is determined that the hybrid device does not have any enabled access points, the hybrid device may not be permitted to become the registrar and the flow ends.

At block 604, transmit one or more advertisement messages including a registrar weight associated with the hybrid device. The flow 600 moves from block 602 to block 604 if it is determined that the hybrid device 102 has at least one enabled access point. The hybrid device 102 can be permitted to contend to become the registrar of the hybrid communication network 100 and can switch to a standby registrar state. In the standby registrar state, the hybrid device 102 (e.g., the communication unit 104) can transmit one or more election advertisement (EA) messages including the registrar weight associated with the hybrid device.

The registrar weight can be assigned to each network device in the hybrid communication network. In one embodiment, the registrar weight can be assigned based a number of enabled access points, a gateway connection status, an active CAP status, and a registrar status. Assuming that each network device can have only one access point per WLAN communication band, the number of enabled access points can refer to the number of WLAN communication bands on which the network device (e.g., the hybrid device 102) is configured to operate as an access point. For example, if the hybrid device 102 has a 2.4 GHz WLAN AP and a 5 GHz WLAN AP, the hybrid device 102 is determined to have two enabled access points. A first hybrid device with a higher number of enabled access points is preferentially weighted over a second hybrid device with a lower number of enabled access points, because the first hybrid device can operate in a higher number of WLAN communication bands. The gateway connection status can refer to whether or not the hybrid device 102 is connected to the network gateway 124 of the hybrid communication network 100. In one embodiment, the registrar weight of a gateway-connected network device can be adjusted/improved by a predetermined factor if the gateway-connected network device has at least one enabled access point to give the gateway-connected network device a higher preference over non-gateway-connected network devices. In one example of this embodiment, the registrar weight of a gateway-connected network device can be increased (or incremented) by the predetermined factor if the gateway-connected network device has at least one enabled access point to give the gateway-connected network device a higher preference over non-gateway-connected network devices.

The active CAP status can refer to whether the hybrid device 102 is currently the CAP of the hybrid communication network 100. In one embodiment, the registrar weight of a network device configured as the CAP can be adjusted (e.g., increased) by a predetermined factor. This can ensure that the CAP is preferentially selected as the registrar as compared to non-CAP devices or standby CAP devices of the hybrid communication network 100. The registrar status can refer to whether the hybrid device 102 is currently the registrar of the hybrid communication network 100. For example, the registrar weight of a hybrid device that is currently the registrar can be adjusted (e.g., increased) by a predetermined factor. This can prevent unnecessary change in the registrar if other equally capable network devices join the hybrid communication network 100. In addition to the EA message, the hybrid device 102 (e.g., the communication unit 104) can also transmit an access point registrar search message to determine whether the hybrid device 102 should become the registrar of the hybrid communication network. In some embodiments, the EA message and the registrar search message can be transmitted at periodic intervals. The flow continues at block 606.

At block 606, it is determined whether the hybrid communication network comprises an active registrar. As discussed above, the hybrid device 102 (contending to become the registrar) can detect whether the hybrid communication network 100 comprises an active registrar by periodically transmitting registrar search messages. If the hybrid device 102 receives a response to the registrar search message (e.g., "AP Auto Config response message"), the hybrid device 102 can infer that the hybrid communication network 100 comprises an active registrar. If the hybrid device 102 does not receive any registrar response messages after a predetermined number of consecutive registrar search messages are transmitted, the hybrid device 102 can infer that there is no active registrar in the hybrid communication network 100. If it is determined that the hybrid communication network does not comprise an active registrar, the flow continues at block 610. Otherwise, if there is already an active registrar in the hybrid communication network, the flow continues at block 608 in FIG. 7.

At block 608, credentials of the hybrid device are cloned based, at least in part, on credentials of the registrar, communication band(s) on which the registrar is configured to operate, and communication band(s) on which the hybrid device is configured to operate. The flow 600 moves from block 606 to block 608, if the hybrid communication network already comprises a registrar. Accordingly, the hybrid device 102 can be configured as an enrollee. As will be further discussed below, depending on whether the registrar and/or the enrollee (e.g., the hybrid device 102) are dual band or single band network devices, the enrollee can clone one or more sets of its credentials in accordance with the registrar. In one embodiment, it can be determined whether the registrar is a dual band network device or a single band network device.

If the registrar is a dual band concurrent (DBDC) device, the hybrid device 102 can clone its credentials associated with the WLAN bands on which the hybrid device 102 is configured to operate. A DBDC device can be a network device that is configured to simultaneously operate on two WLAN communication bands. For example, if the registrar is configured to simultaneously operate on the 2.4 GHz WLAN band and the 5 GHz WLAN band, the hybrid device 102 can clone its credentials associated with the 2.4 GHz WLAN band and the credentials associated with the 5 GHz WLAN band if the hybrid device 102 is also a DBDC device. In some embodiments, the hybrid device and/or the registrar may be a dual band single radio (DBSR) device. A DBSR device can be a network device that can operate on two WLAN communication bands, but not simultaneously. In other words, if the DBSR device is operating on the 2.4 GHz WLAN band, operation on the 5 GHz WLAN band may be disabled, and vice versa. If the hybrid device 102 and the registrar are DBSR devices, the hybrid device 102 can clone its credentials (based on the registrar's credentials) for the communication band on which the registrar is currently operating. However, if the hybrid device 102 is a single band single radio (SBSR) device configured to operate only on the 2.4 GHz WLAN band (or only on the 5 GHz WLAN band), the hybrid device 102 can clone its credentials associated with the 2.4 GHz WLAN band (or its credentials associated with the 5 GHz WLAN band) in accordance with the registrar's credentials. In some embodiments, the hybrid device 102 (acting as an enrollee) can set a credentials_cloned flag in each EA message transmitted from the hybrid device 102. If the hybrid device and the registrar are dual band devices (e.g., DBSR or DBDC devices), the hybrid device 102 can set the credentials_cloned flag after the credentials are cloned on both WLAN bands (e.g., the 2.4 GHz WLAN band and the 5 GHz WLAN band). The credentials_cloned flag can indicate that the hybrid device 102 has the same credentials as the current registrar and will attempt to become the registrar of the hybrid communication network (as will be described below in blocks 610-618.

However, if the hybrid device and the registrar are both single band single radio (SBSR) devices, the hybrid device 102 can clone its credentials in accordance with the registrar's credentials only if the hybrid device 102 is configured to operate on the same WLAN band as the registrar. After the hybrid device 102 clones its credentials in accordance with the registrar's credentials, the hybrid device 102 can set the credentials_cloned flag in each EA message transmitted from the hybrid device 102. It is noted that if the registrar and the hybrid device 102 are not configured to operate on the same WLAN band, the hybrid device 102 may not clone its credentials in accordance with the credentials of the registrar and may not set the credentials_cloned flag. However, if the hybrid device is a dual band (e.g., a DBSR or DBDC) device and the registrar is an SBSR device, the hybrid device 102 can (irrespective of its preferred WLAN band) adapt to the WLAN band on which the single-band registrar is configured to operate and can clone its credentials in accordance with the registrar's credentials. For example, the hybrid device 102 may be configured to operate on the 2.4 GHz WLAN band and the 5 GHz WLAN band and the registrar may be configured to operate only on the 5 GHz WLAN band. In this example, the dual-band hybrid device can first clone its credentials for the WLAN band on which the registrar is operating (e.g., the 5 GHz WLAN band), and can then copy these credentials to the other WLAN band (e.g., the 2.4 GHz WLAN band). After the hybrid device clones its credentials in accordance with the credentials of the registrar, the hybrid device can set the credentials_cloned flag in each EA message transmitted from the hybrid device, as long as the hybrid device is in the enrollee state. The credentials_cloned flag can indicate that the hybrid device 102 has the same credentials as the current registrar and will attempt to become the registrar of the hybrid communication network (as will be described below in blocks 610-618). After credentials of the hybrid device are cloned in accordance with the credentials of the registrar, the, the flow continues at block 610 in FIG. 7.

At block 610, it is determined whether advertisement messages are received from other network devices in the hybrid communication network during a registrar search time interval. The flow 600 moves from block 606 to block 610 if the hybrid communication network does not comprise an active registrar. The flow 600 also moves from block 608 to block 610 if the hybrid communication network comprises an active registrar after the hybrid device clones its credentials in accordance with the registrar's credentials. The hybrid device 102 can wait for the registrar search time interval to receive advertisement messages from other network devices contending to become the registrar of the hybrid communication network. During this registrar search time interval, the hybrid device 102 can also determine whether a registrar response message was received from an existing registrar of the hybrid communication network. If the hybrid device receives advertisement messages from one or more other network devices during the registrar search time interval, the flow continues at block 612. Otherwise, the flow continues at block 616.

At block 612, the registrar weight associated with the hybrid device 102 and the registrar weight associated with the network devices that transmitted the advertisement messages are compared and the network device with the preferred registrar weight is identified. The hybrid device 102 (e.g., the configuration unit 104) can compare the registrar weights associated with the hybrid device 102 and the registrar weights associated with each of the network devices contending to become the registrar (e.g., that transmitted the EA message). It is noted that if multiple network devices are associated with the same selected registrar weight, then the network device with the selected registrar weight and the preferred device identifier (e.g., smallest MAC address) can be identified. In one example, if multiple network devices are associated with the highest registrar weight, then the network device with the highest registrar weight and the smallest device identifier (e.g., smallest MAC address) can be identified. The flow continues at block 614.

At block 614, it is determined whether the hybrid device is associated with the preferred registrar weight. Depending on whether the hybrid device 102 has the preferred registrar weight (e.g., the highest registrar weight), the hybrid device 102 can be configured as the registrar or a standby registrar of the hybrid communication network 100. If the hybrid device is associated with the preferred registrar weight (or the preferred registrar weight and the preferred device identifier), the flow continues at block 616. Otherwise, if the hybrid device is not associated with the preferred registrar weight (or the preferred registrar weight and the preferred device identifier), the flow continues at block 618.

At block 616, the hybrid device is selected as the registrar of the hybrid communication network. The flow 600 moves from block 610 to block 616 if the hybrid device 102 does not receive a registrar response message or an election advertisement message from a network device with cloned credentials during the registrar search time interval. The flow 600 also moves from block 614 to block 616 if the hybrid device 102 is associated with the preferred registrar weight. Thus, a hybrid device (e.g., a TCA-capable network device with at least one AP enabled) that has cloned credentials (from the current or previous registrar, if any) can become a registrar if the following conditions are satisfied—1) there is no other existing registrar in the network and 2) there is no other network device with a preferred registrar weight (as compared to the registrar weight of the hybrid device) and with cloned credentials from the current or previous registrar. After becoming the registrar, the hybrid device 102 can transmit one or more notification messages to indicate that it is the registrar of the hybrid communication network 100. It is noted that while the hybrid device 102 is operating as the registrar, the hybrid device 102 may not set the credentials_cloned flag in an EA message transmitted from the hybrid device 102.

It is noted that while the hybrid device 102 is configured as the registrar, the hybrid device 102 can periodically transmit registrar search messages to determine whether another network device (a statically configured registrar or a user-configured registrar or a non-TCA capable network device) has joined the hybrid communication network 100. If the hybrid device detects a registrar response message from a statically configured or non-TCA capable registrar, the hybrid device 102 can relinquish its role as the registrar and become an enrollee in the hybrid communication network. From block 616, the flow ends.

At block 618, the network device with the preferred registrar weight is selected as the registrar and the hybrid device is configured as the standby registrar. If the hybrid device 102 is not associated with the preferred registrar weight, another network device that is associated with the preferred registrar weight can be selected as the registrar. If the hybrid device 102 is not associated with the preferred registrar weight, the hybrid device 102 can become a standby registrar. When configured as a standby registrar, the hybrid device 102 can continuously (or periodically) determine whether the registrar is part of the hybrid communication network 100 (e.g., whether the current registrar is disabled, etc.). If the hybrid device 102 determines that the current registrar is disabled, the hybrid device 102 can attempt to become the registrar of the hybrid communication network 100. From block 618, the flow ends.

In the example of FIGS. 6-7, the hybrid device 102 (contending to become the registrar of the hybrid communication network 100) can periodically transmit the EA messages (including the registrar weight of the hybrid device 102) irrespective of whether the hybrid device 102 is connected to the network gateway 124 as long as at least one access point of the hybrid device 102 is enabled. In other words, the hybrid device 102 can contend to become the registrar of the hybrid communication network as soon as at least one access point of the hybrid device 102 is enabled. The hybrid device may stop transmitting the EA messages (and may stop contending to become the registrar) if all the access points of the hybrid device 102 are disabled.

In some embodiments, the operations of FIGS. 6-7 can be executed in a different order. In this embodiment, the hybrid device 102 may receive an EA message with a credentials_cloned flag from another network device that is configured as an enrollee (e.g., indicating that the network device cloned its credentials from a current or previous registrar). If the hybrid device 102 has also cloned its credentials from the current or previous registrar, the hybrid device 102 can determine whether the network device has a device weight (and/or device identifier) that is preferred compared to the device weight (and/or device identifier) of the hybrid device 102. If so, the network device may become the registrar and the hybrid device 102 may become the standby registrar (and may restart a registrar search timer to detect the registrar). If the network device does not have a preferred registrar weight (or the same registrar weight with a preferred device identifier) as compared to the hybrid device 102, the hybrid device 102 can ignore the EA message received from the network device. If the hybrid device 102 has not cloned its credentials from the current or previous registrar but the network device has cloned its credentials, the network device may become the registrar and the hybrid device 102 may become the standby registrar (and may restart a registrar search timer to detect the registrar). This is because the hybrid device 102 cannot become the registrar until the hybrid device 102 has cloned its credentials in accordance with the registrar's credentials. If neither the hybrid device nor the network device has cloned their respective credentials and if the network device has a preferred registrar weight (as compared to the hybrid device), the hybrid device can restart a registrar search timer to attempt to detect the registrar. If the hybrid device has cloned its credentials, if the hybrid device has a preferred registrar weight (as compared to the network device), and if the network device has not cloned its credentials, the hybrid device can ignore the EA message received from the network device.

Figure 8:
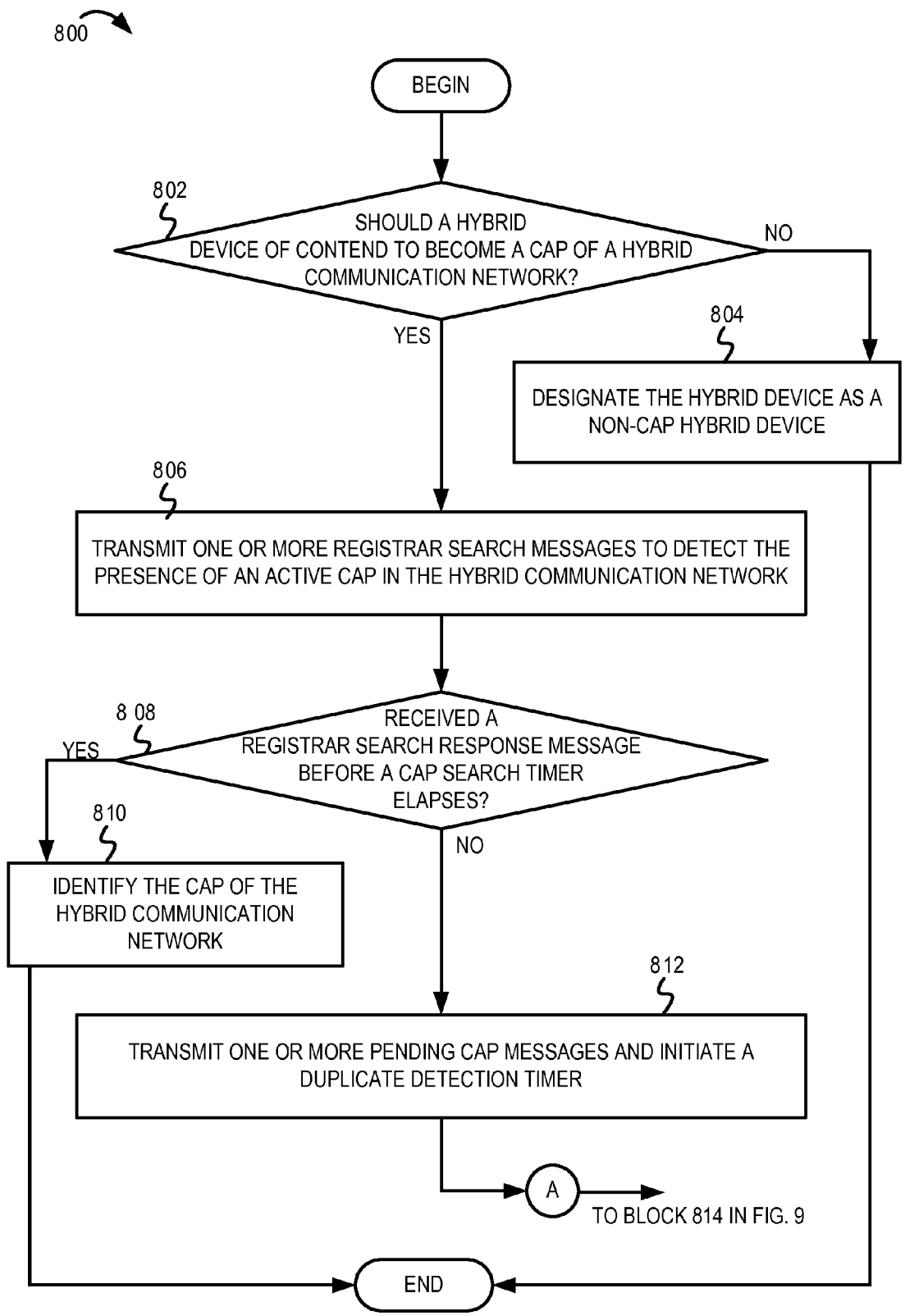
FIG. 8 is a flow diagram illustrating example operations for electing the CAP and the registrar of the hybrid communication network.
Figure 9:
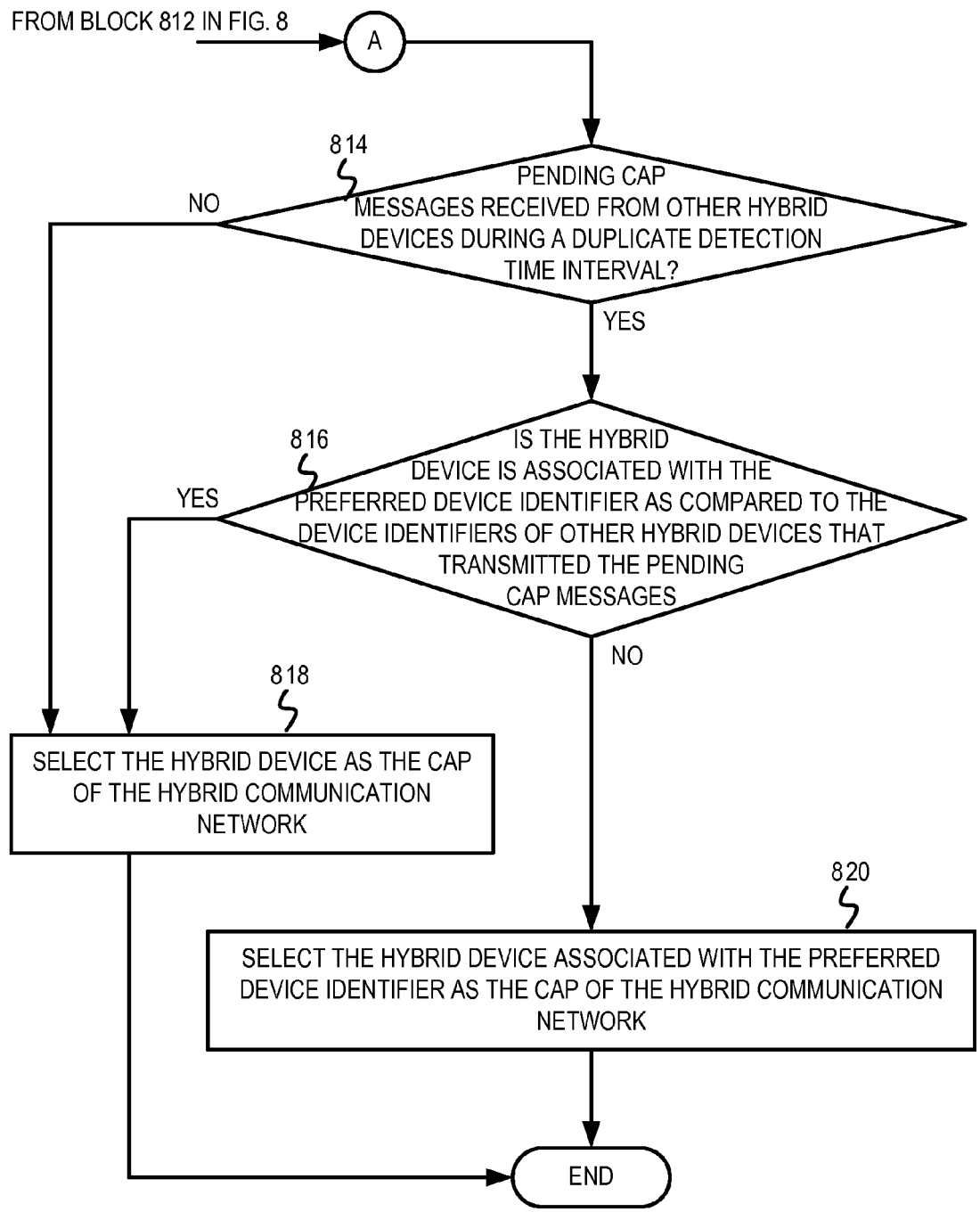
FIG. 9 is a continuation of FIG. 8 and illustrates example operations for electing the CAP and the registrar of the hybrid communication network.

Although FIGS. 1-7 describe example embodiments for selecting a CAP and a registrar of the hybrid communication network 100, various other techniques can be employed to select the CAP and the registrar of the hybrid communication network 100. FIGS. 8-9 describe another embodiment for selecting the CAP and the registrar of the hybrid communication network 100. In the example of FIGS. 6-7 above, a first hybrid device can be elected as the CAP and a second hybrid device can be elected as the registrar. In the example of FIGS. 8-9, it is assumed that the same hybrid device (also referred to as a "master network device") is designated as both the CAP and the registrar of the hybrid communication network 100.

FIG. 8 and FIG. 9 depict a flow diagram illustrating another example embodiment for selecting the CAP and the register of the hybrid communication network. The flow 800 begins at block 802.

At block 802, it is determined whether a hybrid device should contend to become a CAP of a hybrid communication network. In some embodiments, it may be determined (e.g., by the configuration unit 106 of FIG. 1) whether the hybrid device should contend to become a master network device of the hybrid communication network. As discussed above, the master network device can be a hybrid device that is both the CAP and the registrar of the hybrid communication network. In one embodiment, a configuration unit 106 of FIG. 1 can determine whether a DHCP server is detected on the Ethernet interface 110 of the hybrid device 102. If a DHCP server is detected on the Ethernet interface, the hybrid device 102 can be designated as a standby CAP and can contend to become the CAP of the hybrid communication network 100. It is noted that in other embodiments, the configuration unit 106 can determine whether the DHCP server is detected on any suitable network interface (e.g., a PLC interface) of the hybrid device 102. To detect the presence of the DHCP server, the hybrid device can transmit a discovery message (e.g., a DHCP discover message) periodically within a predetermined time interval. After transmitting the DHCP discover messages, the hybrid device 102 can wait to receive one or more corresponding DHCP offer messages from the network gateway 124. If the hybrid device 102 receives a DHCP offer message, it can be inferred that a DHCP server is coupled with the Ethernet interface 110 of the hybrid device 102. Otherwise, if the hybrid device 102 does not receive a DHCP offer message within a predetermined response time interval, it can be inferred that a DHCP server is not coupled with the Ethernet interface 110 of the hybrid device 102. If a DHCP server is not detected on the Ethernet interface 110 of the hybrid device 102, the hybrid device may not contend to become the CAP and the flow continues at block 804. Otherwise, the hybrid device may contend to become the CAP and the flow continues at block 806.

At block 804, the hybrid device is designated as a non-CAP device. The flow 800 moves from block 802 to block 804, if a DHCP server is not detected on the Ethernet interface 110 of the hybrid device 102. Accordingly, the hybrid device 102 may not contend to become the CAP of the hybrid communication network. In general, the hybrid device 102 may not become the master network device (e.g., the CAP and the registrar) of the hybrid communication network. From block 804, the flow ends.

At block 806, one or more registrar search messages are transmitted to detect the presence of an active CAP in the hybrid communication network. The flow 800 moves from block 802 to block 806 if the hybrid device 102 can contend to become the CAP of the hybrid communication network 100. The configuration unit 104 can transmit the registrar messages (e.g., AP auto-config search messages) to query the other network devices to determine whether there is an existing CAP or whether there is a pending CAP. The configuration unit 106 can also start a CAP search timer to set a time interval for which it will wait to detect the presence of an existing CAP or a pending CAP. The flow continues at block 808.

At block 808, it is determined whether a registrar response message was received before the CAP search timer elapses. For example, the configuration unit 106 can determine whether an AP auto-config response message or a pending CAP message was received at the hybrid device 102. The AP auto-config response message can indicate that another hybrid device is designated as the CAP of the hybrid communication network 100. The AP auto-config response message can also indicate an address of the hybrid device designated as the CAP of the hybrid communication network 100. A network device can transmit a pending CAP message to indicate that the network device is contending to become the CAP of the hybrid communication network. In some embodiments, the CAP search time interval can be the time interval during which the hybrid device 102 can search for an existing CAP or another network device attempting to become the CAP (e.g., a pending CAP). If it is determined that the registrar response message was received before the CAP search timer elapses, it is determined that the hybrid communication network comprises a CAP and the flow continues at block 810. If it is determined that the registrar response message was not received and that the CAP search timer has elapsed, it is determined that the hybrid communication network does not comprise a CAP and the flow continues at block 812.

At block 810, the CAP of the hybrid communication network is identified. The flow 800 moves from block 808 to block 810 if a registrar response message was received within the CAP search time interval. The registrar response message can comprise an identifier (e.g., a MAC address, etc.) of the CAP of the hybrid communication network 100. The hybrid device 102 can exchange one or messages with the CAP to estimate communication link quality and to determine how to configure one or more modules (e.g., WLAN STA and/or WLAN AP modules) of the hybrid device 102. It is noted that the hybrid device 102 can remain configured as a standby CAP. The hybrid device 102 can contend to become the CAP of the hybrid communication network 100 if the current CAP is disabled or removed from the hybrid communication network 100. From block 810, the flow ends.

At block 812, one or more pending CAP messages are transmitted and a duplicate detection timer is initiated. The flow 800 moves from block 808 to block 812 if the hybrid communication network 100 does not comprise an active CAP. The hybrid device 102 can announce its intention to become the CAP of the hybrid communication network 100 by transmitting one or more pending CAP messages. After transmitting the pending CAP message, the hybrid device 102 can start the duplicate detection timer (that stores a duplicate detection time interval). During the duplicate detection time interval, the hybrid device 102 can listen for pending CAP messages transmitted by other hybrid devices that are also attempting to become the CAP of the hybrid communication network 100. The hybrid device 102 can transmit a predetermined number of pending CAP messages within the duplicate detection time interval. The flow continues at block 814 in FIG. 9.

At block 814, it is determined whether pending CAP messages were received from other hybrid devices within the duplicate detection time interval. If the hybrid device 102 received pending CAP messages from other hybrid devices within the duplicate detection time interval, the flow continues at block 816. Otherwise, if it is determined that pending CAP messages were not received from other hybrid devices within the duplicate detection time interval, the flow continues at block 818.

At block 816, it is determined whether the hybrid device is associated with the preferred device identifier as compared to the device identifiers of other hybrid devices that transmitted the pending CAP messages. The flow 800 moves from block 814 to block 816 if the hybrid device 102 received pending CAP messages from one or more other hybrid devices during the duplicate detection time interval. In one embodiment, the preferred device identifier can be the lowest device identifier (e.g., a lowest MAC address). In other embodiments, however, other suitable techniques can be employed to determine whether the hybrid device is associated with the preferred device identifier. The hybrid device 102 can compare its device identifier against the device identifiers of the other hybrid devices that transmitted the pending CAP messages. The device identifier can be a MAC address, a hybrid networking layer address, a network interface (e.g., Ethernet) address, or another suitable unique identifier. If it is determined that the hybrid device is associated with the preferred device identifier, the flow continues at block 818. Otherwise, the flow continues at block 820.

At block 818, the hybrid device is selected as the CAP of the hybrid communication network. The flow 800 moves from block 814 to block 818 if the hybrid device 102 did not receive pending CAP messages from other hybrid devices during the duplicate detection time interval. The flow 800 moves from block 816 to block 818 if it is determined that the hybrid device 102 is associated with the preferred device identifier as compared to the device identifiers of other hybrid devices that transmitted the pending CAP messages. After becoming the CAP of the hybrid communication network 100, the hybrid device 102 can transmit a notification to other network devices in the hybrid communication network 100 to indicate that the hybrid device 102 is the CAP. In the example operations of FIGS. 8-9, in addition to selecting the hybrid device as the CAP, the hybrid device may also be selected as the registrar of the hybrid communication network. In other words, the hybrid device may be selected as the "master network device" and may be configured to operate as both the CAP and the registrar of the hybrid communication network. From block 818, the flow ends.

At block 820, the hybrid device with the preferred device identifier is selected as the CAP of the hybrid communication network. The flow 800 moves from block 816 to block 820 if the hybrid device 102 is not associated with the preferred device identifier as compared to the device identifiers of the other hybrid devices that transmitted the pending CAP messages. It is noted that the hybrid device (with the preferred device identifier) may be selected as the "master network device" and may be configured to operate as both the CAP and the registrar of the hybrid communication network. After the hybrid device (e.g., the hybrid device 120) associated with the preferred device identifier (and that transmitted the pending CAP message) is identified and selected as the CAP of the hybrid communication network 100, the configuration unit 106 can designate the hybrid device 102 as a standby CAP. The standby CAP 102 can periodically check for the presence of the CAP and can attempt to become the CAP if the CAP 120 is not found in the hybrid communication network 100. From block 820, the flow ends.

It should be understood that FIGS. 1-9 and the operations described herein are examples meant to aid in understanding embodiments and should not be used to limit embodiments or limit scope of the claims. Embodiments may perform additional operations, fewer operations, operations in a different order, operations in parallel, and some operations differently. It is noted that in some embodiments, during network startup, the active CAP can be the first network device to enable one or more of its access points. The active CAP can become the registrar of the hybrid communication network because the other network devices typically wait to determine their respective configuration until the CAP is selected and the access points of the CAP are initialized. After the other network devices are configured, if one of the other network devices is better suited to be the registrar as compared to the current active registrar (e.g., based on the registrar weights), this network device can become the active registrar of the hybrid communication network and the active CAP can become the standby registrar.

In some embodiments, after the hybrid device becomes the CAP, the hybrid device can execute periodic DHCP checks to ensure that it is still a good CAP and that it is still connected to a DHCP server. If the CAP determines that it is not connected to the DHCP server, the hybrid device (previously configured as the CAP) can become a non-CAP device. A standby-CAP in the hybrid communication network can periodically determine whether the hybrid communication network comprises a CAP (e.g., as discussed in block 802 of FIG. 800). The standby CAP can attempt to become the CAP of the hybrid communication network if determined that the CAP is no longer present in the hybrid communication network. Specifically, if the standby CAP determines that the hybrid communication network does not comprise the CAP, the standby CAP can determine whether it (i.e., the standby CAP) is coupled with a DHCP server. If so, the standby CAP can execute duplicate CAP detection operations described above in block 808 of FIG. 8. Otherwise, the standby CAP can switch to a non-CAP state.

It is further noted that in some embodiments, the hybrid device (when configured as an enrollee) may switch WLAN operating bands (if possible) depending on the registrar of the hybrid communication network. For example, the enrollee may be a dual band network device configured to operate in the 2.4 GHz WLAN band and the 5 GHz WLAN band (preferred communication band). If the registrar is a single band network device configured to operate in the 2.4 GHz WLAN band, the enrollee may adapt its operating band and may operate in the 2.4 GHz WLAN band (even though its preferred band is the 5 GHz WLAN band). If a dual band network device then becomes the new registrar of the hybrid communication network, the enrollee may switch its operating band (from the 2.4 GHz WLAN band) to the 5 GHz (preferred) WLAN band.

It is noted that although FIG. 6 describes credential cloning operations for a hybrid device attempting to become the registrar of the hybrid communication network, embodiments are not so limited. In other embodiments, the credential cloning operations described herein can be executed by other network devices in the hybrid communication network that are not contending to become the registrar of the hybrid communication network. For example, a dual band hybrid device (that is not contending to become the registrar) can select its operating communication band in accordance with the operating communication band of a single band registrar. Likewise, a hybrid device (that is not contending to become the registrar) can clone its credentials in accordance with the credentials of the registrar, the communication bands on which the hybrid device is configured to operate, and the communication bands on which the registrar is configured to operate, as discussed above with reference to block 608 of FIG. 6. For example, if the registrar is configured to operate on the 2.4 GHz WLAN band and if the hybrid device (that is not contending to become the registrar) is configured to operate on the 2.4 GHz WLAN band and the 5 GHz WLAN band, the hybrid device can clone its credentials on the 2.4 GHz WLAN band in accordance with registrar's credentials for the 2.4 GHz WLAN band. The hybrid device can then copy the credentials for the 2.4 GHz WLAN band to the 5 GHz WLAN band.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
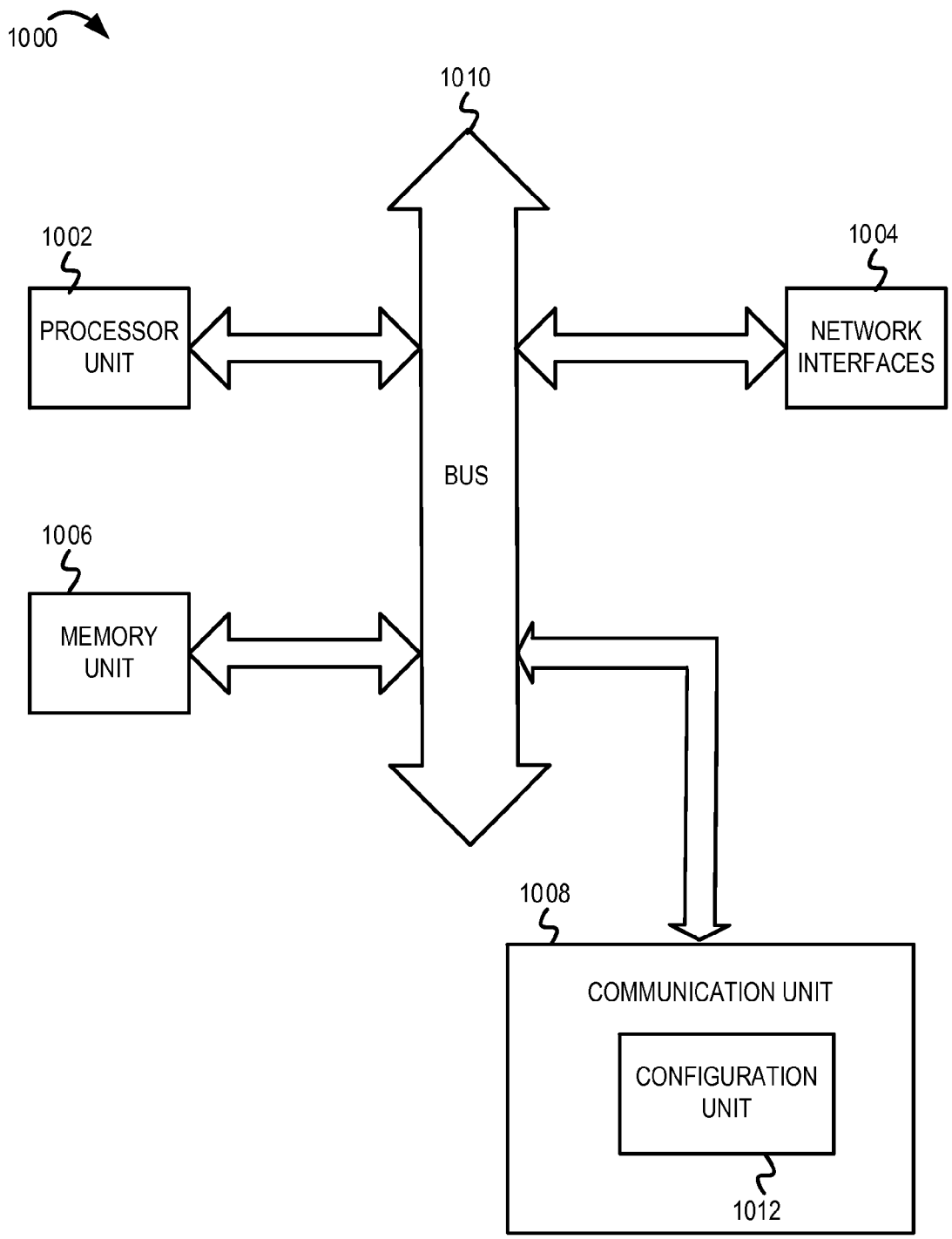
FIG. 10 is a block diagram of one embodiment of an electronic device including a mechanism for automatic selection of coordinating functionality in a hybrid communication network.

FIG. 10 is a block diagram of one embodiment of an electronic device 1000 including a mechanism for automatic selection of coordinating functionality in a hybrid communication network. In some embodiments, the electronic device 1000 can be a laptop computer, a tablet computer, a netbook, a mobile phone, a smart appliance, a gaming console, a desktop computer, or other suitable electronic device comprising communication capabilities. In some embodiments, the electronic device 1000 can be a hybrid device that comprises multiple network interfaces 1004, each of which couples the electronic device 1000 to different communication network segments (or access technologies). The electronic device 1000 includes a processor unit 1002 (possibly including multiple processors, multiple cores, multiple nodes, and/or implementing multi-threading, etc.). The electronic device 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer-readable storage media. The electronic device 1000 also includes a bus 1010 (e.g., PCI, ISA, PCI-Express, Hyper-Transport®, InfiniBand®, NuBus, AHB, AXI, etc.), and network interfaces 1004 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.).

The electronic device 1000 also includes a communication unit 1008. The communication unit 1008 comprises a configuration unit 1012. The configuration unit 1012 can execute functionality described above with reference to FIGS. 1-9 to determine whether to configure the electronic device 1000 as a central access point and/or a registrar of the hybrid communication network. Any one of these functionalities may be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 10 (e.g., video cards, audio cards, additional network interfaces, peripheral devices, etc.). For example, the communication unit 1008 may comprise one or more additional processors that are distinct from the processor unit 1002 coupled with the bus 1010. The processor unit 1002, the memory unit 1006, and the network interfaces 1004 are coupled to the bus 1010. Although illustrated as being coupled to the bus 1010, the memory unit 1006 may be coupled to the processor unit 1002.

While the embodiments are described with reference to various implementations and exploitations, it will be understood that these embodiments are illustrative and that the scope of the inventive subject matter is not limited to them. In general, techniques for automatic selection of coordinating functionality in a hybrid communication network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    transmitting, from a first hybrid device of a hybrid communication network, a first advertisement message including a first device weight associated with the first hybrid device;
    determining whether a second advertisement message is received from a second hybrid device of the hybrid communication network within a first predetermined search time interval;
    in response to determining that the second advertisement message is not received from the second hybrid device within the first predetermined search time interval,
        configuring the first hybrid device as a central access point of the hybrid communication network, wherein the central access point is communicatively coupled to a network gateway of the hybrid communication network via a single communication medium; and
    in response to determining that the second advertisement message is received from the second hybrid device within the first predetermined search time interval,
        selecting a central access point of the hybrid communication network based, at least in part, on the first device weight and a second device weight associated with the second hybrid device.

2. The method of claim 1, wherein said selecting a central access point comprises:
    selecting a central access point based, at least in part, on at least one member selected from a group consisting of the first device weight, the second device weight, a first device identifier associated with the first hybrid device, and a second device identifier associated with the second hybrid device.

3. The method of claim 2, wherein said selecting a central access point comprises:
    if the first device weight is preferred to the second device weight, selecting the first hybrid device as the central access point;
    if the second device weight is preferred to the first device weight, selecting the second hybrid device as the central access point; and
    if the first device weight is equal to the second device weight,
        selecting whichever of the first hybrid device or the second hybrid device that is associated with a preferred device identifier as the central access point.

4. The method of claim 3, further comprising:
    configuring the first hybrid device as a standby central access point of the hybrid communication network in response to determining,
        that the first hybrid device is not associated with a preferred device weight; or
        that the first hybrid device is associated with the preferred device weight and is not associated with the preferred device identifier.

5. The method of claim 1, further comprising:
    determining whether the first hybrid device should contend to become the central access point;
    in response to determining that the first hybrid device should contend to become the central access point,
        configuring the first hybrid device as a standby central access point of the hybrid communication network.

6. The method of claim 5, wherein said determining whether the first hybrid device should contend to become the central access point comprises:
    determining whether a network interface of the first hybrid device is communicatively coupled to a network gateway of the hybrid communication network via a communication medium associated with the network interface; and
    determining that the first hybrid device should contend to become the central access point in response to determining that the network interface is communicatively coupled to the network gateway.

7. The method of claim 5, wherein said determining whether the first hybrid device should contend to become the central access point comprises:
    determining, at the first hybrid device, whether a dynamic host configuration protocol (DHCP) server is communicatively coupled to a network interface of the first hybrid device.

8. The method of claim 7, wherein said determining whether the DHCP server is communicatively coupled to the network interface comprises:
    transmitting a search message from the network interface;
    determining whether the DHCP server is communicatively coupled to the network interface based, at least in part, on whether a response message was received within a predetermined discovery time interval.

9. The method of claim 1, wherein the first device weight is determined based, at least in part, on at least one member selected from a group consisting of whether the first hybrid device is communicatively coupled with the network gateway, device capabilities of the first hybrid device, and communication link speed.

10. The method of claim 1, wherein the first hybrid device is configured as the central access point, said method further comprising:
    adjusting the first device weight by a predetermined factor; and
    transmitting, from the first hybrid device, a third advertisement message including the adjusted first device weight.

11. The method of claim 10, further comprising:
    receiving, from a third hybrid device of the hybrid communication network, a fourth advertisement message including a third device weight associated with the third hybrid device;
    comparing the adjusted first device weight and the third device weight to determine whether the first hybrid device should remain configured as the central access point.

12. The method of claim 1, wherein if the first hybrid device is configured as the central access point, the method further comprises:
receiving, from a third hybrid device of the hybrid communication network, a third advertisement message including a third device weight associated with the third hybrid device;
if the first device weight is preferred to the third device weight,
maintaining the first hybrid device configured as the central access point;
if the first device weight is equal to the third device weight,
comparing a first device identifier associated with the first hybrid device and a second device identifier associated with the third hybrid device;
if the first device identifier is preferred to the second device identifier, maintaining the first hybrid device configured as the central access point; and
if the second device identifier is preferred to the first device identifier, configuring the first hybrid device as a standby central access point of the hybrid communication network; and
selecting the third hybrid device as the central access point.

13. The method of claim 12, wherein said configuring the first hybrid device as the standby central access point comprises:
transmitting, from the first hybrid device, a notification message indicating that the first hybrid device is no longer the central access point.

14. The method of claim 1, wherein the first hybrid device is configured as a standby central access point and a third hybrid device is configured as the central access point, said method further comprising:
detecting, at the first hybrid device, a first notification message from the third hybrid device indicating that the third hybrid device is no longer the central access point;
determining that the first device weight is greater than a third device weight associated with the third hybrid device; and
transmitting a third advertisement message including the first device weight and indicating that the first hybrid device will become the central access point.

15. The method of claim 14, further comprising:
if a response message to the third advertisement message is not received within a second predetermined search time interval, configuring the first hybrid device as the central access point,
wherein the second predetermined search time interval is shorter than the first predetermined search time interval.

16. The method of claim 14, further comprising:
if a response message to the third advertisement message is received within a second predetermined search time interval,
determining that a fourth device weight indicated in the response message is preferred to the first device weight or, if the fourth device weight is equal to the first device weight, determining that a second device identifier indicated in the response message is preferred to a first device identifier associated with the first hybrid device;
transmitting, from the first hybrid device, a second notification message indicating that the first hybrid device is no longer contending to become the central access point; and
configuring the first hybrid device as a standby central access point.

17. The method of claim 1, wherein the first hybrid device is configured as the central access point, said method further comprising:
determining, at the first hybrid device, whether the hybrid communication network includes a registrar;
in response to determining that the hybrid communication network does not include a registrar,
configuring the first hybrid device as a registrar of the hybrid communication network;
in response to determining that the hybrid communication network includes a registrar,
configuring the first hybrid device as a standby registrar of the hybrid communication network, wherein the standby registrar is operable to become the registrar if the current registrar is disabled.

18. The method of claim 17, wherein said determining whether the hybrid communication network includes a registrar comprises:
transmitting, from the first hybrid device, a registrar search message;
determining that the hybrid communication network does not include a registrar if a response to the registrar search message is not received within a predetermined registrar search time interval; and
determining that the hybrid communication network includes a registrar if the response to the registrar search message is received within the predetermined registrar search time interval.

19. The method of claim 17, wherein the first hybrid device is configured as the registrar, said method further comprising:
transmitting, from the first hybrid device, a registrar search message;
configuring the first hybrid device as the standby registrar if a response to the registrar search message is received within a predetermined registrar search time interval.

20. The method of claim 1, further comprising:
determining that the first hybrid device includes an enabled access point in an operating communication band; and
the first hybrid device contending to become a current registrar of the hybrid communication network in response to said determining that the first hybrid device includes an enabled access point in the operating communication band.

21. The method of claim 20, wherein said contending to become the current registrar further comprises:
transmitting, from the first hybrid device, a first registrar advertisement message comprising a first registrar weight associated with the first hybrid device;
transmitting, from the first hybrid device, a registrar search message;
determining whether a response to the register search message was received within a predetermined registrar search time interval; and
if the response to the registrar search message is received within the predetermined registrar search time interval,
determining that the hybrid communication network includes a current registrar;
configuring the first hybrid device as a standby registrar that is operable to become the registrar if the current registrar is disabled; and
determining at least one credential for the first hybrid device based, at last in part, on credentials of the current registrar, communication band configuration of the first hybrid device, and communication band configuration of the current registrar.

22. The method of claim 21, wherein the first registrar weight is determined based, at least in part, on at least one member selected from a group consisting of a number of enabled access points associated with the first hybrid device, whether the first hybrid device is communicatively coupled with a network gateway of the hybrid communication network, whether the first hybrid device is the central access point, and whether the first hybrid device is the current registrar.

23. The method of claim 21, wherein said determining at least one credential for the first hybrid device comprises:
if the current registrar is configured to operate on a plurality of communication bands and the first hybrid device is configured to operate on at least a subset of the plurality of communication bands,
for each of the subset of communication bands, cloning the at least one credential for the first hybrid device from the credentials of the current registrar; and
if the current registrar is configured to operate on a single communication band,
determining whether the first hybrid device and the current registrar are configured to operate on the same communication band;
cloning the at least one credential for the first hybrid device for the single communication band from the credentials of the current registrar for the single communication band, in response to determining that the first hybrid device and the current registrar are configured to operate on the same single communication band; and
determining not to clone the at least one credential for the first hybrid device from the credentials of the current registrar in response to determining that the first hybrid device and the current registrar are not configured to operate on the same single communication band.

24. The method of claim 23, further comprising:
transmitting a credentials cloned indication after cloning the at least one credential for the first hybrid device; and
determining whether the first hybrid device should become the registrar based, at least in part, on the first registrar weight and a second registrar weight associated with the current registrar.

25. The method of claim 21, wherein if the current registrar is configured to operate on a single communication band and if the first hybrid device is configured to operate on a plurality of communication bands, said determining at least one credential for the first hybrid device comprises:
for a first communication band of the plurality of communication bands on which the current registrar and the first hybrid device are configured to operate,
cloning the at least one credential for the first hybrid device from the credentials of the current registrar;
for the remainder of the plurality of communication bands on which the first hybrid device is configured to operate and the current registrar is not configured to operate, copying the cloned credentials for the remainder of the plurality of communication bands.

26. The method of claim 21, wherein said determining that the hybrid communication network includes the current registrar further comprises:
if determined that the current registrar is configured to operate on a first operating communication band of the first hybrid device, configuring the first hybrid device to operate on the first operating communication band; and
if determined that the registrar is not configured to operate on the first operating communication band of the first hybrid device,
identifying a second operating communication band of the current registrar;
determining whether the first hybrid device can be configured to operate on the second operating communication band of the current registrar.

27. The method of claim 21, further comprising:
determining that a third hybrid device transmitted a second registrar advertisement message within the predetermined registrar search time interval;
comparing the first registrar weight against a second registrar weight associated with the third hybrid device to determine whether to configure the first hybrid device as the registrar.

28. The method of claim 27, wherein said comparing the first registrar weight against the second registrar weight comprises:
if the first registrar weight is preferred to the second registrar weight,
configuring the first hybrid device as the registrar;
if the second registrar weight is preferred to the first registrar weight,
selecting the third hybrid device as the registrar; and
configuring the first hybrid device as the standby registrar; and
if the first registrar weight is equal to the second registrar weight,
comparing a first device identifier associated with the first hybrid device against a second device identifier associated with the third hybrid device;
if the first device identifier is preferred to the second device identifier, configuring the first hybrid device as the registrar; and
if the second device identifier is preferred to the first device identifier, selecting the third hybrid device as the registrar and configuring the first hybrid device as the standby registrar.

29. A method comprising:
determining, at a first hybrid device, whether a hybrid communication network comprises a central access point that is communicatively coupled to a network gateway of the hybrid communication network via a single communication medium;
in response to determining that the hybrid communication network does not comprise a central access point,
transmitting, from the first hybrid device, a first advertisement message indicating intent of the first hybrid device to become the central access point of the hybrid communication network;
determining whether to configure the first hybrid device as the central access point based, at least in part, on whether a second advertisement message was received from a second hybrid device of the hybrid communication network.

30. The method of claim 29, wherein in response to determining that the second advertisement message was received from the second hybrid device within a predetermined time interval, the method further comprises:
comparing a first device identifier associated with the first hybrid device and a second device identifier associated with the second hybrid device;
in response to determining that the first device identifier is preferred to the second device identifier based, at least in part, on the comparing, configuring the first hybrid device as the central access point; and
in response to determining that the second device identifier is preferred to the first device identifier based, at least in part, on the comparing, selecting the second hybrid device as the central access point and configuring the first hybrid device as a standby central access point of the hybrid communication network.

31. The method of claim 29, wherein in response to determining that the second advertisement message was not received from the second hybrid device within a predetermined time interval, the method further comprises:
configuring the first hybrid device as the central access point.

32. The method of claim 29, wherein, in response to configuring the first hybrid device as the central access point, the method further comprises:
configuring the first hybrid device as a registrar of the hybrid communication network.

33. The method of claim 29, further comprising:
determining, at the first hybrid device, whether a dynamic host configuration protocol (DHCP) server is communicatively coupled to a network interface of the first hybrid device;
determining the first hybrid device should contend to become the central access point in response to determining that the DHCP server is communicatively coupled to the network interface; and
determining the first hybrid device should not contend to become the central access point in response to determining that the DHCP server is not communicatively coupled to the network interface.

34. The method of claim 29, wherein said determining whether the hybrid communication network includes a central access point comprises:
transmitting a search message from the first hybrid device;
determining whether a search response message was received within a predetermined search time interval;
in response to determining that a response message was received within the predetermined search time interval,
determining that the hybrid communication network includes a central access point; and
exchanging communications with the central access point to determine how to configure the first hybrid device;
in response to determining that a search response message was not received within the predetermined search time interval,
determining that the hybrid communication network does not include a central access point.

35. A method comprising:
determining whether a first hybrid device of a hybrid communication network includes an enabled access point in an operating communication band;
if determined that the first hybrid device comprises an enabled access point in an operating communication band,
determining, at the first hybrid device, whether the hybrid communication network includes a registrar; and
determining whether to configure the first hybrid device as a registrar of the hybrid communication network based, at least in part, on said determining whether the hybrid communication network includes a registrar; and
if determined that the first hybrid device does not include an enabled access point determining to not configure the first hybrid device as the registrar.

36. The method of claim 35, comprising:
in response to determining that the hybrid communication network does not include a registrar,
configuring the first hybrid device as a registrar of the hybrid communication network;
in response to determining that the hybrid communication network includes a registrar,
configuring the first hybrid device as a standby registrar of the hybrid communication network, wherein the standby registrar is operable to become the registrar if the current registrar is disabled.

37. The method of claim 36, wherein said determining whether the hybrid communication network includes a registrar comprises:
transmitting, from the first hybrid device, a registrar search message;
if a response to the registrar search message is received within a predetermined registrar search time interval,
determining that the hybrid communication network includes a registrar; and
determining at least one credential for the first hybrid device based, at least in part, on credentials of the registrar, communication band configuration of the first hybrid device, and communication band configuration of the registrar.

38. The method of claim 37, wherein said determining the at least one credential for the first hybrid device comprises:
if the registrar is configured to operate on a plurality of communication bands and the first hybrid device is configured to operate on at least a subset of the plurality of communication bands,
for each of the subset of communication bands on which the first hybrid device is configured to operate, cloning the at least one credential for the first hybrid device from the credentials of the registrar; and
if the registrar is configured to operate on a single communication band,
determining whether the first hybrid device and the registrar are configured to operate on the same single communication band;
cloning the at least one credential for the first hybrid device for the single communication band from the credentials of the registrar for the communication band, in response to determining that the first hybrid device and the registrar are configured to operate on the same single communication band; and
determining not to clone the at least one credential for the first hybrid device from the credentials of the registrar in response to determining that the first hybrid device and the registrar are not configured to operate on the same single communication band.

39. The method of claim 38, wherein after cloning the at least one credential for the first hybrid device for each communication band in which the first hybrid device is configured to operate, the method further comprises:
the first hybrid device determining whether to become a registrar of the hybrid communication network based, at least in part, on a first registrar weight associated with the first hybrid device and a second registrar weight associated with the current registrar.

40. The method of claim 37, wherein if the registrar is configured to operate on a single communication band and if the first hybrid device is configured to operate on a plurality of communication bands, said determining at least one credential for the first hybrid device comprises:
for a first communication band of the plurality of communication bands on which the registrar and the first hybrid device are configured to operate,
cloning the at least one credential for the first hybrid device from the credentials of the registrar;

for the remainder of the plurality of communication bands on which the first hybrid device is configured to operate and the registrar is not configured to operate,
copying the cloned credentials for the remainder of the plurality of communication bands.

41. The method of claim 37, further comprising:
determining that a second hybrid device transmitted a second registrar advertisement message within the predetermined registrar search time interval;
comparing a first registrar weight associated with the first hybrid device against a second registrar weight associated with the second hybrid device;
if the first registrar weight is preferred to the second registrar weight,
configuring the first hybrid device as the registrar;
if the second registrar weight is preferred to the first registrar weight,
selecting the second hybrid device as the registrar; and
configuring the first hybrid device as the standby registrar; and
if the first registrar weight is equal to the second registrar weight,
comparing a first device identifier associated with the first hybrid device against a second device identifier associated with the second hybrid device;
if the first device identifier is preferred to the second device identifier, configuring the first hybrid device as the registrar; and
if the second device identifier is preferred to the second device identifier, selecting the second hybrid device as the registrar and configuring the first hybrid device as the standby registrar.

42. A first hybrid network device comprising:
a processor;
a configuration unit coupled with the processor, the configuration unit configured to:
transmit first advertisement message including a first device weight associated with the first hybrid network device;
determine whether second advertisement message is received from a second hybrid network device of a hybrid communication network within a first predetermined search time interval;
in response to determining that the advertisement message is not received from the second hybrid network device within the first predetermined search time interval,
configure the first hybrid network device as a central access point of the hybrid communication network, wherein the central access point is communicatively coupled to a network gateway of the hybrid communication network via a single communication medium; and
in response to determining that the advertisement message is received from the second hybrid network device within the first predetermined search time interval,
select a central access point of the hybrid communication network based, at least in part, on the first device weight and a second device weight associated with the second hybrid network device.

43. The first hybrid network device of claim 42, wherein the configuration unit configured to select a central access point comprises the configuration unit configured to:
if the first hybrid network device is associated with a preferred device weight, select the first hybrid network device as the central access point,
if the second hybrid network device is associated with the preferred device weight, select the second hybrid network device as the central access point,
if both the first hybrid network device and the second hybrid network device are associated with the preferred device weight, select whichever of the first hybrid network device or the second hybrid network device that is associated with a preferred device identifier as the central access point.

44. The first hybrid network device of claim 42, wherein after configuring the first hybrid network device as the central access point, the configuration unit is further configured to:
adjust the first device weight by a predetermined factor; and
transmit a third advertisement messages including the adjusted first device weight.

45. The first hybrid network device of claim 42, wherein if the first hybrid network device is configured as a standby central access point of the hybrid communication network and a third hybrid network device is configured as the central access point, the configuration unit is further configured to:
detect a notification message from the third hybrid network device indicating that the third hybrid network device is no longer the central access point;
determine that the first device weight is preferred to a third device weight associated with the third hybrid network device; and
transmit a third advertisement message including the first device weight and indicating that the first hybrid network device will become the central access point.

46. A hybrid device of a hybrid communication network comprising:
a processor;
a configuration unit coupled with the processor, the configuration unit configured to:
determine whether the hybrid device includes an enabled access point in an operating communication band;
if determined that the hybrid device includes an enabled access point in an operating communication band,
determine whether the hybrid communication network includes a current registrar; and
determine whether to configure the hybrid device as a registrar of the hybrid communication network based, at least in part, on determining whether the hybrid communication network includes a current registrar; and
if determined that the hybrid network device does not include an enabled access point, determine to not configure the hybrid device as a registrar of the hybrid communication network.

47. The hybrid network device of claim 46, wherein the configuration unit configured to determine whether the hybrid communication network includes a registrar comprises the configuration unit configured to:
transmit a registrar search message;
if a response to the registrar search message is received within a predetermined registrar search time interval,
determine that the hybrid communication network includes the registrar; and
determine at least one credential for the hybrid network device based, at least in part, on credentials of the registrar, communication band configuration of the hybrid network device, and communication band configuration of the registrar.

48. The hybrid network device of claim 47, wherein the configuration unit configured to determine at least one credential for the hybrid network device comprises the configuration unit configured to:
  in response to a determination that the registrar is configured to operate on a plurality of communication bands and the hybrid network device is configured to operate on at least a subset of the plurality of communication bands,
    for each of the subset of communication bands, clone the at least one credential for the hybrid network device from the credentials of the registrar; and
  in response to a determination that the registrar is configured to operate on a single communication band,
    determine whether the hybrid network device and the registrar are configured to operate on the same single communication band;
    clone the at least one credential for the hybrid network device for the single communication band from the credentials of the registrar for the single communication band, in response to determining that the hybrid network device and the registrar are configured to operate on the same single communication band; and
    determine not to clone the at least one credential for the hybrid network device from the credentials of the registrar in response to determining that the hybrid network device and the registrar are not configured to operate on the same communication band.

49. The hybrid network device of claim 47, wherein in response to a determination that the registrar is configured to operate on a single communication band and that the hybrid network device is configured to operate on a plurality of communication bands, the configuration unit configured to determine at least one credential for the hybrid network device comprises the configuration unit configured to:
  for a first communication band on which the registrar and the hybrid network device are configured to operate,
    clone the at least one credential for the hybrid network device from the credentials of the registrar;
  for the remainder of the plurality of communication bands on which the hybrid network device is configured to operate and the registrar is not configured to operate,
    copy the cloned credentials for the remainder of the plurality of communication bands.

50. A non-transitory machine-readable medium having program instructions stored therein, the program instructions to:
  transmit, from a first hybrid device of a hybrid communication network, first advertisement message including a first device weight associated with the first hybrid device;
  determine whether a second advertisement message is received from a second hybrid device of the hybrid communication network within a first predetermined search time interval;
  in response to determining that the second advertisement message is not received from the second hybrid device within the first predetermined search time interval,
    configure the first hybrid device as a central access point of the hybrid communication network, wherein the central access point is communicatively coupled to a network gateway of the hybrid communication network via a single communication medium; and
  in response to determining that the second advertisement message is received from at least the second hybrid device within the first predetermined search time interval,
    select a central access point of the hybrid communication network based, at least in part, on the first device weight and a second device weight associated with the second hybrid device.

51. The non-transitory machine-readable medium of claim 50, wherein the program instructions comprise program instructions to:
  after configuration of the first hybrid device as the central access point,
    receive, from a third hybrid device, a third advertisement message including a third device weight associated with a third hybrid device;
    compare the first device weight and the third device weight;
    if the first device weight is preferred to the third device weight,
      maintain the first hybrid device configured as the central access point;
    if the third device weight is preferred to the first device weight,
      configure the first hybrid device as a standby central access point of the hybrid communication network; and
      select the third hybrid device as the central access point; and
    if the first device weight is equal to the third device weight,
      compare a first device identifier associated with the first hybrid device and a second device identifier associated with the third hybrid device;
    if the first device identifier is preferred to the second device identifier,
      maintain the first hybrid device configured as the central access point; and
    if the second device identifier is preferred to the first device identifier,
      configure the first hybrid device as the standby central access point; and
      select the third hybrid device as the central access point.

52. The non-transitory machine-readable medium of claim 50, wherein the program instructions comprise program instructions to:
  in response to a determination that the first hybrid device is configured as a standby central access point of the hybrid communication network and a third hybrid device is configured as the central access point,
    detect, at the first hybrid device, a notification message from the third hybrid device indicating that the third hybrid device is no longer the central access point;
    determine that the first device weight is preferred to a second device weight associated with the second hybrid device;
    transmit a third advertisement message including the first device weight and that indicates that the first hybrid device will become the central access point.

53. A non-transitory machine-readable medium having program instructions stored therein, the program instructions to:
  determine whether a hybrid device of a hybrid communication network includes an enabled access point in an operating communication band;
  in response to a determination that the hybrid device includes an enabled access point in an operating communication band,
    determine, at the hybrid device, whether the hybrid communication network includes a current registrar; and determine whether to configure the hybrid device as a registrar of the hybrid communication network based, at least in part, on said determining whether the hybrid communication network includes a current registrar; and in response to a determination that the hybrid device does not include an enabled access point, determine to not configure the hybrid device as the registrar.

54. The non-transitory machine-readable medium of claim 53, wherein the program instructions to determine whether the hybrid communication network includes a current registrar comprises program instructions to:

transmit a registrar search message;

in response to a determination that a response to the registrar search message is received within a predetermined registrar search time interval, determine that the hybrid communication network includes a current registrar; and determine at least one credential for the hybrid device based, at least in part, on credentials of the registrar, communication band configuration of the hybrid device, and communication band configuration of the registrar.

55. The non-transitory machine-readable medium of claim 54, wherein the program instructions to determine the at least one credential for the hybrid device comprises program instructions to:

in response to a determination that the registrar is configured to operate on a plurality of communication bands and the hybrid device is configured to operate on at least a subset of the communication bands, for each of the subset of communication bands, clone the at least one credential for the hybrid device from the credentials of the registrar; and in response to a determination that the registrar is configured to operate on a single communication band, determine whether the hybrid device and the registrar are configured to operate on the same single communication band;

clone the at least one credential for the hybrid device for the single communication band from the credentials of the registrar for the single communication band, in response to determining that the hybrid device and the registrar are configured to operate on the same single communication band; and determine not to clone the at least one credential for the hybrid device from the credentials of the registrar in response to determining that the hybrid device and the registrar are not configured to operate on the same single communication band.

56. The non-transitory machine-readable medium of claim 54, wherein the program instructions to determine at least one credential for the hybrid device comprises program instructions to:

in response to a determination that the registrar is configured to operate on a single communication band and the hybrid device is configured to operate on a plurality of communication bands, for a first communication band of the plurality of communication bands on which the registrar and the hybrid device are configured to operate, clone the at least one credential for the hybrid device from the credentials of the registrar;

for the remainder of the plurality of communication bands on which the hybrid device is configured to operate and the registrar is not configured to operate, copy the cloned credentials for the remainder of the plurality of communication bands.

\* \* \* \* \*